United States Patent
Hall et al.

(10) Patent No.: US 12,555,224 B2
(45) Date of Patent: Feb. 17, 2026

(54) METHOD AND SYSTEM FOR PERFORMING NON-INVASIVE GENETIC TESTING USING AN ARTIFICIAL INTELLIGENCE (AI) MODEL

(71) Applicant: ASTEC CO., Ltd., Fukuoka (JP)

(72) Inventors: Jonathan Michael MacGillivray Hall, Adelaide (AU); Donato Perugini, Adelaide (AU); Michelle Perugini, Adelaide (AU); Tuc Van Nguyen, Adelaide (AU); Sonya Maree Diakiw, Adelaide (AU)

(73) Assignee: ASTEC CO., Ltd., Fukuoka (JP)

( * ) Notice: Subject to any disclaimer, the term of this patent is extended or adjusted under 35 U.S.C. 154(b) by 1000 days.

(21) Appl. No.: 17/763,401

(22) PCT Filed: Sep. 25, 2020

(86) PCT No.: PCT/AU2020/000111
§ 371 (c)(1),
(2) Date: Mar. 24, 2022

(87) PCT Pub. No.: WO2021/056046
PCT Pub. Date: Apr. 1, 2021

(65) Prior Publication Data
US 2022/0343178 A1 Oct. 27, 2022

(30) Foreign Application Priority Data
Sep. 25, 2019 (AU) .................. 2019903584

(51) Int. Cl.
*G06T 7/00* (2017.01)
*G06V 20/69* (2022.01)
*G16H 30/40* (2018.01)

(52) U.S. Cl.
CPC .......... *G06T 7/0012* (2013.01); *G06T 7/0014* (2013.01); *G06V 20/69* (2022.01);
(Continued)

(58) Field of Classification Search
CPC ......... G06T 7/0012; G06T 2207/10056; G06T 2207/20081; G06T 2207/20084;
(Continued)

(56) References Cited

U.S. PATENT DOCUMENTS 8,323,177 B2 * 12/2012 Wong ................ G01N 33/5005
435/375
8,755,611 B2 6/2014 Tate et al.
(Continued)

FOREIGN PATENT DOCUMENTS

CN 104462673 A 3/2015
CN 109409182 A 3/2019
(Continued)

OTHER PUBLICATIONS

Miyagi, Yasunari, et al. "Feasibility of deep learning for predicting live birth from a blastocyst image in patients classified by age." Reproductive medicine and biology 18.2 (2019): 190-203. (Year: 2019).*

(Continued)

*Primary Examiner* — Jesse P Frumkin
(74) *Attorney, Agent, or Firm* — Suzannah K. Sundby, Esq.; Canady + Lortz LLP

(57) ABSTRACT

An Artificial Intelligence (AI) based computational system is used to non-invasively estimate the presence of a range of aneuploidies and mosaicism in an image of embryo prior to implantation. Aneuploidies and mosaicism with similar risks of adverse outcomes are grouped and training images are labelled with their group. Separate AI models are trained for each group using the same training dataset and the separate (Continued)

models are then combined, such as by using an Ensemble or Distillation approach to develop a model that can identify a wide range of aneuploidy and mosaicism risks. The AI model for a group is generated by training multiple models including binary models, hierarchical layered models and a multi-class model. In particular the hierarchical layered models are generated by assigning quality labels to images. At each layer the training set is partitioned in the best quality images and other images. The model at that layer is trained on the best quality images, and the other images are passed down to the next layer and the process repeated (so the remaining images are separated into next best quality images and other images). The final model can then be used to non-invasively identify aneuploidy and mosaicism and associated risk of adverse outcomes from an image of an embryo prior to implantation.

19 Claims, 11 Drawing Sheets

(52) U.S. Cl.
CPC ... *G16H 30/40* (2018.01); *G06T 2207/10056* (2013.01); *G06T 2207/20081* (2013.01); *G06T 2207/20084* (2013.01); *G06T 2207/30044* (2013.01)

(58) Field of Classification Search
CPC ........ G06T 2207/30044; G06T 7/0014; G06N 3/126; G06N 3/045; G06N 3/0464; G06N 3/08; G06N 3/09; G06N 3/096; G06N 7/01; G06V 20/69; G16H 30/40; G06F 18/214
See application file for complete search history.

(56) References Cited

U.S. PATENT DOCUMENTS

| | | | |
|---|---|---|---|
| 9,984,278 B2 | 5/2018 | Needleman et al. | |
| 10,489,904 B2 | 11/2019 | Barnes et al. | |
| 11,321,831 B2 | 5/2022 | Shafiee et al. | |
| 11,335,000 B2 | 5/2022 | Iwata et al. | |
| 2003/0088565 A1 | 5/2003 | Walter et al. | |
| 2007/0179746 A1 | 8/2007 | Jiang et al. | |
| 2010/0136529 A1 | 6/2010 | Shoemaker et al. | |
| 2010/0188496 A1 | 7/2010 | Xie et al. | |
| 2010/0312070 A1 | 12/2010 | Rottem | |
| 2011/0230362 A1 | 9/2011 | Craig et al. | |
| 2011/0254943 A1 | 10/2011 | Ozinsky et al. | |
| 2012/0215727 A1 | 8/2012 | Malik et al. | |
| 2013/0230230 A1 | 9/2013 | Ajemba et al. | |
| 2014/0017717 A1 | 1/2014 | Loewke et al. | |
| 2014/0247972 A1 | 9/2014 | Wang et al. | |
| 2015/0016117 A1 | 1/2015 | Tsai et al. | |
| 2015/0268227 A1* | 9/2015 | Tan | G06T 7/0016 435/29 |
| 2015/0346187 A1 | 12/2015 | Loewke et al. | |
| 2015/0356461 A1 | 12/2015 | Vinyals et al. | |
| 2016/0359886 A1 | 12/2016 | Yadav et al. | |
| 2017/0089820 A1* | 3/2017 | Wong | C12Q 1/6881 |
| 2017/0098172 A1 | 4/2017 | Ellenbogen et al. | |
| 2017/0132528 A1 | 5/2017 | Aslan et al. | |
| 2018/0039905 A1 | 2/2018 | Anghel et al. | |
| 2018/0268292 A1 | 9/2018 | Choi et al. | |
| 2019/0042958 A1 | 2/2019 | Letterie et al. | |
| 2019/0073591 A1 | 3/2019 | Andoni et al. | |
| 2019/0236478 A1 | 8/2019 | Wu et al. | |
| 2020/0111212 A1 | 4/2020 | Tsai et al. | |
| 2020/0126233 A1 | 4/2020 | Shinoda et al. | |
| 2020/0311916 A1* | 10/2020 | Tran | G16H 30/40 |

FOREIGN PATENT DOCUMENTS

| | | |
|---|---|---|
| JP | 2019097425 A | 6/2019 |
| JP | 2019121141 A | 7/2019 |
| WO | WO 2014089647 A1 | 6/2014 |
| WO | WO 2019042571 A1 | 3/2019 |

OTHER PUBLICATIONS

Varghese, Alex C., and Charalampos S. Siristatidis. "automation, artificial intelligence and innovations in the future of IVF." In Vitro Fertilization: A Textbook of Current and Emerging Methods and Devices. Cham: Springer International Publishing, 2019. 847-860. (Year: 2019).*

Anil et al, "Large Scale Distributed Neural Network Training Through Online Distillation", 2018, arxiv 1804.03235v1 [cs.LG], 12 pages.

Annan et al., "Biochemical Pregnancy During Assisted Conception: A Little Bit Pregnant," *J Clin Med Res.* 5(4): 269-74, 2013.

Bormann et al., "Performance of a deep learning based neural network in the selection of human blastocytes for implantation," eLife 9:e55301, 2020. (14 pages).

Breiman, "Random Forests," Machine Learning 45(1): 5-32, 2001.

Chavez-Badiola et al, "Embryo Ranking Intelligent Classification Algorithm (ERICA): artificial intelligence clinical assistant predicting embryo ploidy and implantation," *Reproductive BioMedicine Online* 41(4):585-593 doi:<https://doi.org/10.1016/j.rbmo.2020.07.003>, 2020.

Chavez-Badiola et al, "Predicting pregnancy test results after embryo transfer by image feature extraction and analysis using machine learning", *Scientific Reports* 10:4394 https://doi.org/10.1038/s41598-020-61357-9, 2020, 6 pages.

Chen et al, "Does time-lapse imaging have favorable results for embryo incubation and selection compared with conventional methods in clinical in vitro fertilization? A meta-analysis and systematic review of randomized controlled trials," PLoS One. 12(6): e0178720, 2017, 18 pages.

Gardner et al., "Assessment of Embryo Viability: The Ability to Select a Single Embryo for Transfer—a Review," *Placenta*, 24 Suppl B: S5-12, 2003. (Abstract only).

Gardner et al., "Diagnosis of human preimplantation embryo viability," *Hum Reprod Update* 21(6): 727-747, 2015.

GBD 2017 Population and Fertility Collaborators, "Population and fertility by age and sex for 195 countries and territories, 1950-2017: a systematic analysis for the Global Burden of Disease Study 2017," Lancet 392(10159): 1995-2051, 2018.

He et al., "Deep Residual Learning for Image Recognition," IEEE Conference on Computer Vision and Pattern Recognition (CVPR) 27-30; 770-8, Jun. 2016.

Hearst, "Support Vector Machines," *IEEE Intelligent System* 13(4):18-28, 1998.

Huang et al., "Densely Connected Convolutional Networks," IEEE Conference on Computer Vision and Pattern Recognition (CVPR); 2261-2269, 2017.

Khan, "Automated Monitoring of Early Stage Human Embryonic Cells in Time-lapse Microscopy Images." Doctor of Philosophy Thesis, The Australian National University, 2016, 143 pages.

Khan et al, "Deep Convolutional Neural Networks for Human Embryonic Cell Counting", Conference paper; Part of the Lecture Notes in Computer Science book series 9913, Sep. 18, 2016.

Kheradmand, "Human Embryo Component Detection using Computer vision." Thesis, Applied Sciences: School of Engineering Science, Apr. 2017, 89 pages.

Khosravi et al., "Deep learning enables robust assessment and selection of human blastocysts after in vitro fertilization," NPJ Digit Med. 2: 21, 2019, 9 pages.

Kingma et al., "Adam: A Method for Stochastic Optimization," Computing Research Repository (CoRR), abs/1412.6980, 2014, 15 pages.

Kragh et al., "Automatic grading of human blastocysts from time-lapse imaging," *Computers in Biology and Medicine* 115:103494, Oct. 15, 2019, 10 pages.

(56) References Cited

OTHER PUBLICATIONS

Manna et al., "Artificial intelligence techniques for embryo and oocyte classification," *Reproductive BioMedicine Online* 26:42-49, 2013.

Rocha et al. "A Method Based on Artificial Intelligence To Fully Automatize The Evaluation of Bovine Blastocyst Images," *Scientific Reports* 7, Article No. 7659, (2017), 10 pages.

Rokach, "Ensemble-based classifiers," *Artificial Intelligence Review* 33(1):1-39, 2010.

Rumelhart et al., "Learning representations by back-propagating errors," *Nature* 323(6088):533-536, 1986.

Sahlsten et al., "Deep Learning Fundus Image Analysis for Diabetic Retinopathy and Macular Edema Grading," *Scientic Reports* 9(1):10750, 2019, 11 pages.

Segal et al., "Development of a decision tool to predict blastocyst formation," *Fertility and Sterility* 109(3):e49-e50, 2018.

Storr et al., "Inter-observer and intra-observer agreement between embryologists during selection of a single Day 5 embryo for transfer: a multicenter study," *Human Reproduction* 32(2):307-314, 2017.

Szegedy et al., "Inception-v4, Inception-ResNet and the Impact of Residual Connections on Learning," Proceedings of the Thirty-First AAAI Conference on Artificial Intelligence (AAAI-17):4278-4284, 2017, 12 pages.

Tran et al., "Deep learning as a predictive tool for fetal heart pregnancy following time-lapse incubation and blastocyst transfer," *Human Reproduction* 34(6):1011-1018, 2018.

Wang et al., "In vitro fertilization (IVF): a review of 3 decades of clinical innovation and technological advancement," *Therapeutics and Clinical Risk Management* 2(4):355-364, 2006.

Wong et al., "Non-invasive imaging of human embryos before embryonic genome activation predicts development to the blastocyst stage," *Nature Biotechnology* 28(10):1115-1121, 2010.

Zhang et al., "Deep Mutual Learning," CVPR, 4320-4328, 2018, 9 pages.

Schmid, "AI Cloud: Artificial Intelligence in the Cloud—A Step into the Future," Jul. 4, 2019, URL=https://netrics.ch/blog/ai-cloud, retrieved on Sep. 15, 2023. (9 pages).

VerMilyea, "New Research: Artificial Intelligence Non-Invasively Detects Chromosome 21-Linked Genetic Disorders," Aug. 28, 2018, URL=https://www.prweb.com/releases/new-research-artificial-intelligence-non-invasively-detects-chromosome-21-linked-genetic-disorders-885602227.html. (4 pages).

VerMilyea et al., "Artificial intelligence: non-invasive detection of morphological features associated with abnormalities in chromosomes 21 and 16," *Fertility and Sterility* 112(3):e237-e238, Oct. 15, 2019. (2 pages).

\* cited by examiner

METHOD AND SYSTEM FOR PERFORMING NON-INVASIVE GENETIC TESTING USING AN ARTIFICIAL INTELLIGENCE (AI) MODEL

CROSS-REFERENCE TO RELATED APPLICATIONS

The present application is a US national stage application of International Application Number PCT/AU2020/000111 filed 25 Sep. 2020, which claims priority from Australian Provisional Patent Application No. 2019903584 titled "Method and System for performing non-invasive genetic testing using an Artificial Intelligence (AI) Model" and filed on 25 Sep. 2019, the content of each application of which is hereby incorporated by reference in its entirety.

BACKGROUND

Technical Field

The present disclosure relates to Artificial Intelligence (AI) including Computer Vision and Deep Learning based classification of images. In a particular form the present disclosure relates to computational AI methods for noninvasively identifying aneuploidy in embryos for In-vitro Fertilization (IVF).

Description of the Related Art

Human cells contain 23 pairs of chromosomes (46 in total), unless suffering from adverse effects, such as cell damage from radiation or inherited conditions/congenital disease. In these cases, one or more of the chromosomes can be modified, either wholly or in part. This can have wide ranging and long term health effects on developing embryos that continue into adult life, and there is a high level of value in understanding whether patients either exhibit such chromosomal abnormalities, or are carriers of chromosome variants that predispose their children to such diseases, so that they can be treated adequately. While prospective parents may have one or multiple genetic predispositions, it is not possible to predict in advance whether progeny will in actual fact exhibit one or more genetic abnormalities.

One commonly-used assisted reproductive technology (ART) is to test embryos, post-fertilization, and perform genetic sequencing in order to gauge the genetic health of the embryo, and classify it as 'euploid' (genetically typical) or 'aneuploid' (exhibiting a genetic alteration).

This screening technique is especially prominent in the IVF process, where embryos are fertilized outside the body, and re-implanted into the prospective mother in approximately 3 to 5 days after fertilization. This is often a decision taken by the patient in consultation with their IVF doctor as part of a process in assisting diagnosis of potential fertility complications experienced by the couple, or to diagnose early any disease risks, and to select against them.

This screening process, known as pre-implantation genetic screening (PGS), or pre-implantation genetic testing for aneuploidy (PGT-A), and has a number of features that make it less than ideal, however, it still currently remains the most viable option in the fertility industry for obtaining genetic information about the embryo.

The largest risk factor in performing PGT-A is that the test is highly invasive, as typically a small number of cells from the developing embryo need to be removed (using one of a range of biopsy techniques) in order to perform the test. The long term effects to embryo development from this technique are uncertain and are not fully characterized. Furthermore, all embryos that undergo PGT-A need to be transported to and from the laboratory undertaking the biopsy, and with a delay of days or weeks on the clinic receiving the results. This means that the 'time to pregnancy', an important measure of success in IVF treatments, is extended, and also that all such embryos must undergo freezing. Since modern freezing techniques, such as vitrification have in recent years improved markedly compared to 'slow freezing' in terms of embryo survival, it is now common practice among many IVF clinics, even in cases where PGT-A is carried out. The reasoning behind this is to allow the prospective mother's hormone levels to rebalance after stimulation of hyper-ovulation, to increase the embryos likelihood of implantation.

It is unclear whether modern vitrification techniques are harmful to the embryo. Because of the prevalence and widely-accepted usage of vitrification techniques and PGT-A, particularly in the United States, PGT-A is carried out as routine, with most embryos undergoing this process and obtaining genetic data for the clinic and patient.

A further issue in the performance of PGT-A is due to embryo 'mosaicism'. This term means that the chromosomal profile of individual cells collected in a biopsy may not be representative of the whole embryo, even at the early cell-division stage of embryo development. That is a mosaic embryo is a mixture of euploid (chromosomally normal) cells and aneuploid cells (excess/deletion/modification of chromosomes) and there may be multiple distinct aneuploidies present in different cells (including cases where all cells are aneuploid cells and there are no euploid cells present in the embryo). As a result, PGT-A results taken from different cells from the same embryo can disagree from one another. As there is no way to assess whether a biopsy is representative, the overall accuracy/reliability of such PGT-A testing is reduced.

There is thus a need to provide improved methods for perform genetic screening of embryos, or to at least provide a useful alternative to existing methods.

BRIEF SUMMARY

According to a first aspect of the present invention, there is provided a method for computationally generating an aneuploidy screening Artificial Intelligence (AI) model for screening embryo images for the presence of aneuploidy, comprising:

defining a plurality of chromosomal group labels, wherein each group comprises one or more distinct aneuploidies comprising distinct genetic alterations or chromosomal abnormalities;

generating a training dataset from a first set of images, wherein each image comprises an image of an embryo captured after in-vitro fertilization, and is labelled with one or more chromosomal group labels where each label indicates if at least one aneuploidy associated with the respective chromosomal group is present in at least one cell of the embryo, and the training dataset includes images labelled with each of the chromosomal groups;

generating a test dataset from a second set of images, wherein each image comprises an image of an embryo taken after in-vitro fertilization, and is labelled with one or more chromosomal group labels where each label indicates if at least one aneuploidy associated with the respective chromosomal group is present, and the test dataset includes images labelled with each of the chromosomal groups;

separately training at least one chromosomal group AI model for each chromosomal group using the training dataset for training all models, wherein each chromosomal group AI model is trained to identify morphological features in images labelled with the associated chromosomal group label, and/or training at least one multi-group AI model on the training data wherein each multi-group AI model is trained to independently identify morphological features in images labelled with each of the associated chromosomal group labels to generate a multi-group output on an input image to indicate whether at least one aneuploidy associated with each of the chromosomal group is present or absent in the image;

selecting a best chromosomal group AI model for each of the chromosomal groups or a best multi-group AI model using the test dataset; and deploying the selected AI model to screen embryo images for the presence of one or more aneuploidies.

In one form, the step of separately training at least one chromosomal group AI model for each chromosomal group comprises training a hierarchical layered model and/or training at least one multi-group AI model, wherein training a hierarchical layered model may comprise:

training a hierarchical sequence of layered models, wherein at each layer, images associated with a chromosomal group are assigned a first label and are trained against a second set of images, wherein the second set of images are grouped based on a maximum level of quality, and at each sequential layer the second set of images are subset of images from the second set in the previous layer having a lower quality than the maximum quality of the second set in the previous layer.

In a further form training a hierarchical layered model may comprise:

allocating a quality label to each image in the plurality of images, wherein the set of quality labels comprises a hierarchical set of quality labels comprising at least "viable euploid embryos", "euploid non-viable embryos", "non-serious aneuploid embryos", and "serious aneuploid embryos";

training a top layer model by dividing the training set into a first quality dataset with a "viable euploid embryos" label and another dataset comprising all other images, and training a model on images labelled with the chromosomal group and images in the first quality dataset;

sequentially training one or more middle layer models, wherein at each middle layer a next quality level dataset is generated from selecting images with labels with the highest quality label in the other dataset, and a model is trained on images labelled with the chromosomal group and images in the next quality dataset; and training a base layer model on images labelled with the chromosomal group and images in the other dataset from the previous layer.

In a further form, after training a first base level model for a first chromosomal group, for each other chromosomal group training a hierarchical layered model comprises training the other chromosomal group against the other dataset used to train the first base level model.

In a further form the step of separately training at least one chromosomal group AI model for each chromosomal group may further comprise training one or more binary models for each chromosomal group comprising:

labelling images in the training dataset with a label matching the chromosomal group with a present label, and labelling all other images in the training set with an absent label, and training a binary model using the present and absent labels to generate a binary output on an input image to indicate whether the a chromosomal abnormality associated with the chromosomal group is present in the image.

In a further form the hierarchical layered models are each binary models.

In one form each chromosomal group label further comprises a plurality of mutually exclusive aneuploidy classes wherein the probabilities of the aneuploidy classes within a chromosomal group sum to 1, and the AI model is a multi-class AI model trained to estimate the probability of each aneuploidy class within the chromosomal group. In a further form, the aneuploidy classes may comprise ("loss", "gain", "duplication", "deletion", "normal").

In one form, the method may further comprise:

generating an Ensemble model for each chromosomal group comprising:

training a plurality of final models, wherein each of the plurality of final models is based on the best chromosomal group AI model for the respective group, and each of the plurality of final models is trained on the training dataset with a different set of initial conditions and image ordering;

combining the plurality of trained final models according to an ensemble voting strategy.

In one form, the method may further comprise:

generating a distillation model for each chromosomal group comprising:

training a plurality of teacher models, wherein each of the plurality of teacher models is based on the best chromosomal group AI model for the respective group, and each of the plurality of teacher models is trained on at least part of the training dataset with a different set of initial conditions and image ordering;

training a student model using the plurality of trained teacher models on the training dataset using a distillation loss function.

In one form, the method may further comprise:

receiving a plurality of images, each image comprises an image of an embryo taken after in-vitro fertilization and one or more aneuploidy outcomes;

separating the plurality of images into the first set of images and the second set of images, and assigning one or more chromosomal group labels to each image based on the associated one or more aneuploidy outcomes, wherein the first set of images and the second set of images have similar proportions of each of the chromosomal group labels.

In one form, each group comprises a plurality of distinct aneuploidies with similar risks of adverse outcomes. In a further form the plurality of chromosomal group labels comprises at least a low risk group, and a high risk group. In a further form the low risk group comprises at least chromosomes 1, 3, 4, 5, 17, 19, 20 and '47,XYY' and the high risk group comprises a least chromosomes 13, 16, 21 and '45,X', '47,XXY' and '47, XXX'.

In one form the images may be captured within 3 to 5 days post fertilization.

In one form the relative proportions of each of the chromosomal groups in the test dataset is similar to the relative proportions of each of the chromosomal groups in the training dataset.

According to a second aspect of the present invention, there is provided a method for computationally generating an estimate of the presence of one or more aneuploidies in an image of an embryo, the method comprising:

generating, in a computational system, an aneuploidy screening AI model according to the method of the first aspect;

receiving, from a user via a user interface of the computational system, an image containing an embryo captured after in-vitro fertilization; and providing the image to the aneuploidy screening AI model to obtain an estimate of the presence of one or more aneuploidies in the image; and sending a report on the presence of one or more aneuploidies in the image to the user via the user interface.

According to a third aspect of the present invention, there is provided a method for obtaining an estimate of the presence of one or more aneuploidies in an image of an embryo, the method comprising:

uploading, via a user interface, an image captured during a pre-determined time window after In-Vitro Fertilization (IVF) to a cloud based Artificial Intelligence (AI) model configured to generate an estimate of the presence of one or more aneuploidies in an image wherein the AI model is generated according to the method of the first aspect;

receiving an estimate of the presence of one or more aneuploidies in an image of an embryo via the user interface.

According to a fourth aspect of the present invention, there is provided a cloud based computational system configured to computationally generate an aneuploidy screening Artificial Intelligence (AI) model configured according to the method of the first aspect.

According to a fifth aspect of the present invention, there is provided a cloud based computational system configured to computationally generate an estimate of the presence of one or more aneuploidies in an image of an embryo, wherein the computational system comprises:

one or more computation servers comprising one or more processors and one or more memories configured to store an aneuploidy screening Artificial Intelligence (AI) model configured to generate an estimate of the presence of one or more aneuploidies in an image of an embryo, wherein the an aneuploidy screening Artificial Intelligence (AI) model is generated according to the method of the first aspect and wherein the one or more computational servers are configured to:

receive, from a user via a user interface of the computational system, an image;

provide the image to the aneuploidy screening Artificial Intelligence (AI) model to obtain an estimate of the presence of one or more aneuploidies in the image; and send a report on the presence of one or more aneuploidies in the image to the user via the user interface.

According to a sixth aspect of the present invention, there is provided a computational system configured to generate an estimate of the presence of one or more aneuploidies in an image of an embryo, wherein the computational system comprises at least one processor, and at least one memory comprising instructions to configure the at least one processor to:

receive an image captured during a pre-determined time window after In-Vitro Fertilization (IVF);

upload, via a user interface, the image captured during a pre-determined time window after In-Vitro Fertilization (IVF) to a cloud based Artificial Intelligence (AI) model configured to generate an estimate of the presence of one or more aneuploidies in an image of an embryo wherein the AI model is generated according to the method of any one of claims 1 to 13;

receive an estimate of the presence of one or more aneuploidies in an image of an embryo via the user interface; and display the estimate of the presence of one or more aneuploidies in an image of an embryo via the user interface.

BRIEF DESCRIPTION OF THE SEVERAL VIEWS OF THE DRAWINGS

Embodiments of the present disclosure will be discussed with reference to the accompanying drawings wherein.

In the following description, like reference characters designate like or corresponding parts throughout the figures.

DETAILED DESCRIPTION

Embodiments of a non-invasive method for screening embryos for the presence/likelihood of aneuploidies (genetic alterations) are described. These aneuploidies, that is genetic alterations, lead to modification, deletion or additional copies of chromosomal portions, or even entire chromosomes. In many cases these chromosomal abnormalities will lead to subtle (and occasionally, clear) changes in the appearance of chromosomes in images of embryos. Embodiments of the method use a computer vision based Artificial Intelligence (AI)/machine learning model to detect the presence of aneuploidies (i.e., (chromosomal abnormalities) based wholly on morphological data extracted from phase contrast microscope images of embryos (or similar images of embryos). The AI model uses computer vision techniques to detect often subtle morphological features in embryo images to estimate the probability or likelihood of the presence (or absence) of a range of aneuploidies. This estimate/information can then be used to assist in making implantation decisions or decisions on which embryos to select for invasive PGT-A testing.

The system has the advantage that it is non-invasive (i.e., working purely on microscope images) and analysis can be performed in seconds after collection of an image by uploading the image using a cloud based user interface which analyses the image using a previously trained AI model on cloud based servers to rapidly return likelihood estimates of aneuploidy (or specific aneuploidies) to the clinician.

Figure 1A:
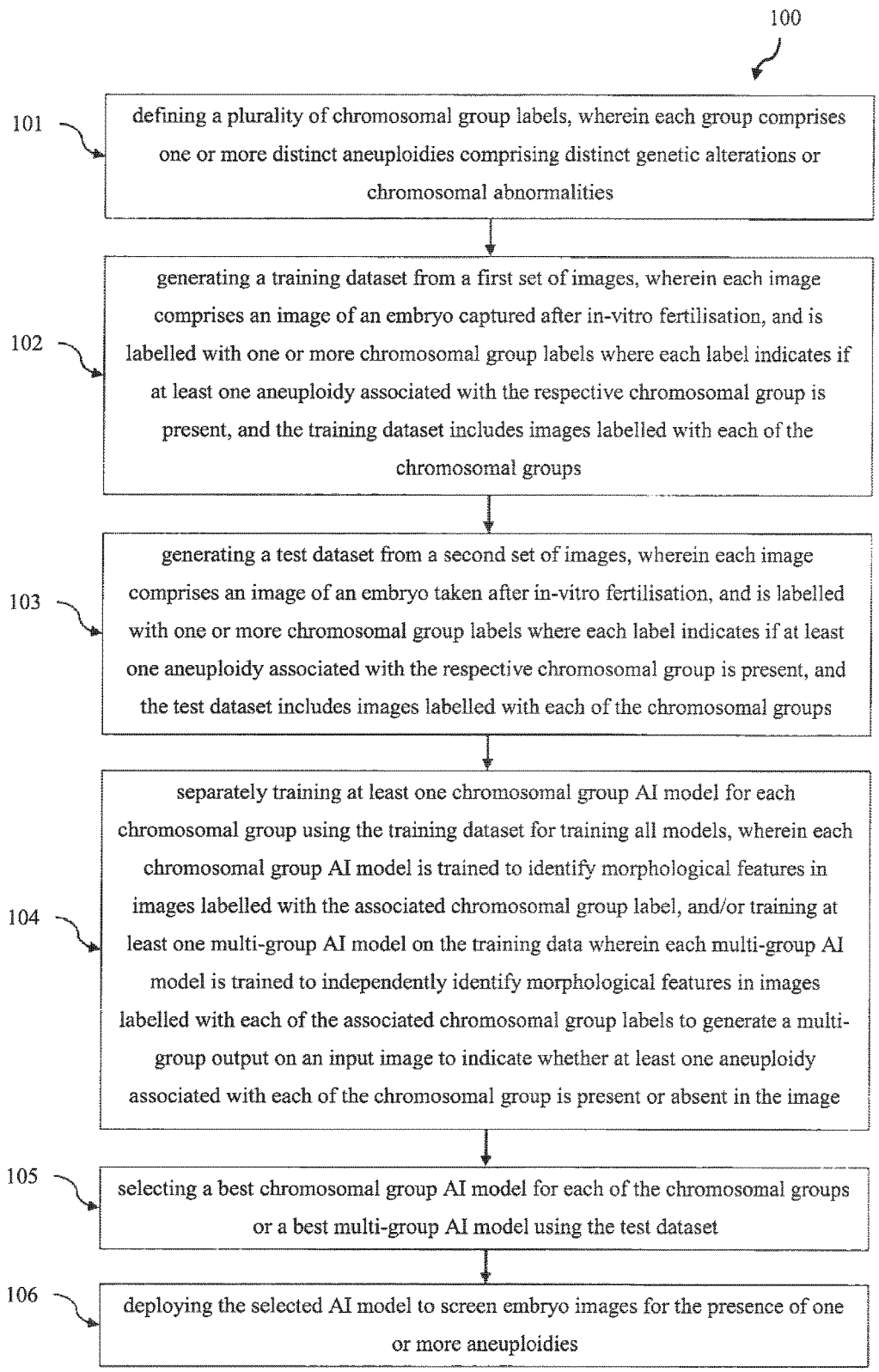
FIG. 1A is a flowchart of a method for computationally generating an aneuploidy screening Artificial Intelligence (AI) model for screening embryo images for the presence of aneuploidy according to an embodiment.
Figure 1B:
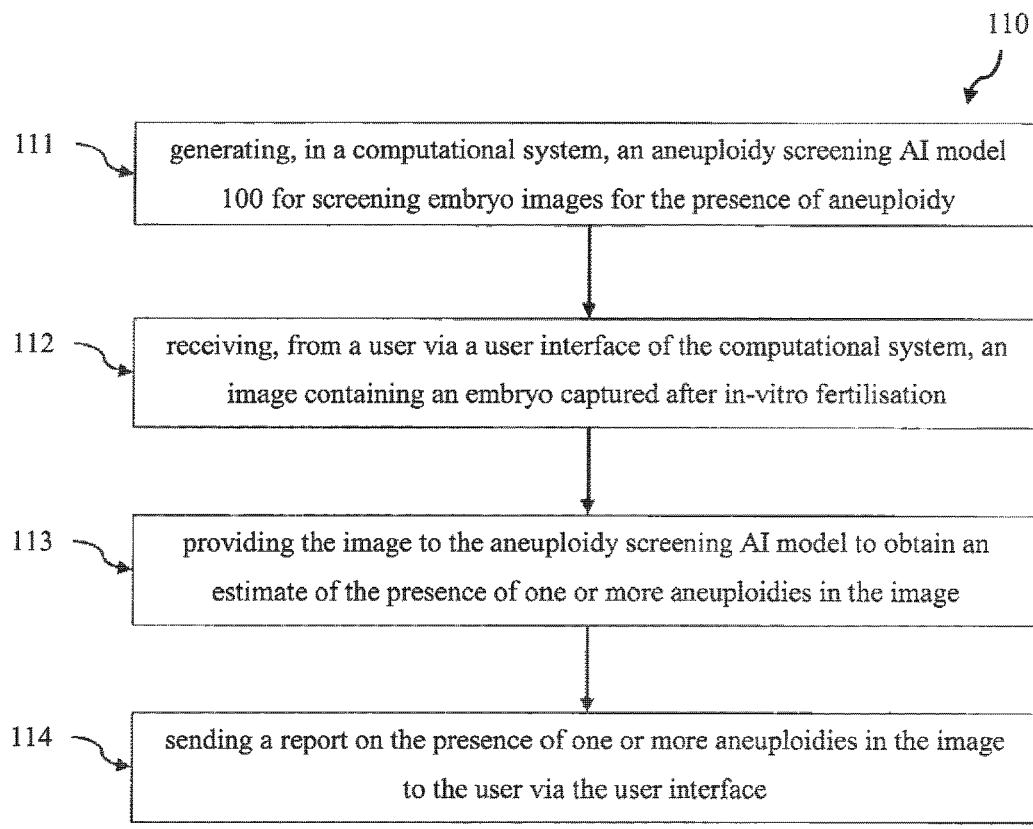
FIG. 1B is a flowchart of a method for computationally generating an estimate of the presence of one or more aneuploidies in an image of an embryo using a trained aneuploidy screening AI model according to an embodiment.

FIG. 1A is a flowchart of a method 100 for computationally generating an aneuploidy screening Artificial Intelligence (AI) model for screening embryo images for the presence of aneuploidy. FIG. 1B is a flowchart of a method 110 for computationally generating an estimate of the presence of one or more aneuploidies in an image of an embryo using a trained aneuploidy screening AI model (i.e., generated as per FIG. 1A).

For the 22 types of non-sex chromosome, the types of chromosomal abnormalities considered include: a full Gain, a full Loss, a Deletion (partial, within a chromosome), a Duplication (partial, within a chromosome) compared to Normal chromosome structure. For the sex chromosomes, the types of abnormalities considered include: Deletion (partial, within a chromosome), Duplication (partial, within a chromosome), a full Loss: '45,X', three types of full Gain: '47,XXX', '47,XXY', '47,XYY' compared to Normal XX or Normal XY chromosomes.

Embryos may also exhibit mosaicism in which different cells in the embryo have different sets of chromosomes. That is the embryo may comprise one or more euploid cells and one or more aneuploid cells (i.e., having one or more chromosomal abnormalities). Further multiple aneuploidies may be present with different cells having different aneuploidies (for example one cell could have a deletion on chromosome 1, whilst another may have gain of X such as 47, XXX). In some extreme cases each cell in a mosaic embryo exhibits aneuploidy (i.e., there are no euploid cells). Thus the AI model may be trained to detect aneuploidies in on or more cells of the embryo, and thus detect the presence of mosaicism.

The output of the AI model may be expressed as likelihood of an outcome such as aneuploidy risk score or as an embryo viability score. It will be understood embryo viability and aneuploidy risk are complementary terms. For example if they are probabilities then the sum of embryo viability risk and aneuploidy risk may be 1. That is both measure the likelihood of an adverse outcome such as risk of miscarriage or serious genetic disorder. We will thus refer to the outcome as an aneuploidy risk/embryo viability score. The outcome could also be likelihood of being in a specific risk category of adverse outcome, such as very low risk, low risk, medium risk, high risk, very high risk. Each risk category may comprise a group of at least one, and typically more, specific chromosomal abnormalities with similar probabilities of adverse outcome. For example the very low risk could be no aneuploidies detected, the low risk group could be aneuploidies/mosaicism in chromosomes (1, 3, 10, 12 and 19), the medium risk group could be aneuploidies/mosaicism in chromosomes 4, 5, and 47, XYY, etc. The likelihood could be expressed as a score over a predefined scale, a probability from 0 to 1.0 or a hard classification such as hard binary classification (aneuploidy present/absent) or hard classification into one of several groups (low risk, medium risk, high risk, very high risk).

In step 101 we define a plurality of chromosomal group labels. Each group comprises one or more distinct aneuploidies comprising distinct genetic alterations or chromosomal abnormalities. Different aneuploidies/genetic alterations will have different effects on embryos leading to different chromosomal abnormalities. Within the chromosomal group labels, a separate mosaicism category may be defined, which, if present, can be low, medium, or high, which indicates that the same embryo can exhibit different type of chromosomal abnormalities. The level of seriousness (risk) of mosaicism may also take into account the number of cells exhibiting mosaicism and/or the type of aneuploidy present. Chromosomal group labels can thus include not only the affected chromosome numbers, but also whether there was mosaicism present (at some level). This allows a finer description of the progressive levels of aneuploidy or genetic health of the embryo. The level of seriousness of the mosaicism present is contingent on the level of seriousness of the chromosomes involved in the mosaicism, as described in Table 1 below. Additionally the level of seriousness may be related to the number of cells exhibiting mosaicism. Based on clinical evidence, for example based on PGT-A tests and pregnancy outcomes, it is possible to group different aneuploidies/chromosomal abnormalities based on the risk and severity of an adverse outcome, and thus assign a priority for implantation (aneuploidy risk/embryo viability score). Table 1 lists Number and Type of Chromosomal Abnormalities Among Spontaneous Abortions and Live Births in 100,000 Pregnancies from Griffiths A J F, Miller J H, Suzuki D T, et al., "An Introduction to Genetic Analysis", 7th edition, New York: W. H. Freeman; 2000.

TABLE 1

The Number and Type of Chromosomal Abnormalities Among Spontaneous Abortions and Live Births in 100,000 Pregnancies from Griffiths AJF, Miller JH, Suzuki DT, et al., "An Introduction to Genetic Analysis", 7th edition, New York: W. H. Freeman; 2000. In cases defined by an extra or missing sex chromosome, the format is '47,' (or '45,') followed by the sex chromosomes.

| | 100,000 Pregnancies | |
|---|---|---|
| | 15,000 Spontaneous Abortions 7,500 Chromosomally Abnormal | 85,000 Live Births 550 Chromosomally Abnormal |
| Trisomy | | |
| 1 | 0 | 0 |
| 2 | 159 | 0 |
| 3 | 53 | 0 |
| 4 | 95 | 0 |
| 5 | 0 | 0 |
| 6-12 | 561 | 0 |
| 13 | 128 | 17 |
| 14 | 275 | 0 |
| 15 | 318 | 0 |
| 16 | 1229 | 0 |
| 17 | 10 | 0 |
| 18 | 223 | 13 |
| 19-20 | 52 | 0 |
| 21 | 350 | 113 |
| 22 | 424 | 0 |
| Sex Chromosomes | | |
| 47, XYY | 4 | 46 |
| 47, XXY | 4 | 44 |
| 45, X | 1350 | 8 |
| 47, XXX | 21 | 44 |
| Translocations | | |
| Balanced | 14 | 1640 |
| Unbalanced | 225 | 52 |
| Polyploid | | |
| Triploid | 1275 | 0 |
| Tetraploid | 450 | 0 |
| Other (mosaics, etc.). | 280 | 49 |
| Total | 7500 | 550 |

Table 1, or similar data obtained from other clinical studies can be used to group aneuploidies based on risk level. Those with the highest risk are considered the lowest priority for transfer, and the highest priority to identify to avoid adverse outcomes post-implantation. For example, we could form a first low risk group comprised of chromosomes 1, 3, 4, 5, 17, 19, 20 and '47,XYY' based on the number of spontaneous abortions being less than 100 per 100,000 pregnancies. A medium risk group comprised of chromosomes 2, and 6-12 can be defined based on the number of spontaneous abortions being less than 200 per 100,000 pregnancies (and more than 100). A high risk group comprised of comprised of chromosomes 14, 15, 18 and 22 can be defined based on the number of spontaneous abortions being greater than 200 per 100,000 pregnancies. A final very high risk group comprised of chromosomes 13, 16, 21 and '45,X', '47,XXY' and '47, XXX' can be defined based on the number of spontaneous abortions being greater than 1000 per 100,000 pregnancies or known to generate live births with adverse health effects. Other divisions could also be used, for example a first group could comprise be divided into chromosomes 1, 3, 10, 12, 19, and 20 and a second slightly higher risk group of chromosomes 4, 5 and 47,XYY'. Also chromosomes could be separately classified based on complete additions (trisomy), normal pair (disomy) and complete deletions (monosomy). For example chromosome 3 (disomy) could be in a different group to chromosome 3 (trisomy). Generally trisomy (complete additions) will be considered high risk and avoided.

The chromosomal groups may comprise a single chromosome, or a subset of chromosomes, for example of similar risk profiles or below a risk threshold. The chromosomal groups may define specific types or classes of mosaicism, such as types of chromosomes and counts of aneuploid cells in the embryo. These chromosome(s) will then be the focus of the construction of an AI/machine learning model, which will identify morphological features associated with modifications to that chromosome. In one embodiment each image is labelled using class labels based on the implantation priorities/risk profiles, for example based on groupings outlined above based on the risks listed in Table 1 (e.g., embryo images in the "low risk" group may be assigned class label 1, embryo images in the "medium risk" group may be assigned class label 2, etc.). It is noted that the above groupings are illustrative only, and in other embodiments, other clinical risk profiles or other clinical data or risk factors can be used to define (different) chromosomal groups, and assign chromosomal group labels to images. As noted above, embryo's may exhibit mosaicism where different cells in an embryo possess different sets of chromosomes so the (mosaic) embryo is a mixture of euploid (chromosomally normal) and aneuploid cells (excess/deletion/modification of chromosomes). Thus risk groups may be defined based on the presence of mosaicism and the type and number/extend of aneuploidy present. In some embodiments the risk may be based on the most serious aneuploidy present in an embryo (even if present in only a single cell). In other embodiments, a threshold number of low risk aneuploidies may be defined, after which the embryo would be reclassified as a higher risk due to the abundance of aneuploidies (i.e., number of aneuploidies exceeds the threshold).

At step 102, we generate a training dataset 120 from a first set of images. Each image comprises an image of an embryo captured after in-vitro fertilization, and is labelled with one or more chromosomal group labels. Each label indicates if at least one aneuploidy associated with the respective chromosomal group is present. The training dataset is configured to include images labelled with each of the chromosomal groups, so that the models are exposed to each of the chromosomal groups to be detected. It is further noted that an individual embryo/image may have multiple different aneuploidies, and thus be labelled with, and included in, multiple chromosomal groups.

Similarly, at step 103, we generate a test dataset 140 from a second set of images. Again, each image comprises an image of an embryo taken after in-vitro fertilization, and is labelled with one or more chromosomal group labels. Each label indicates if at least one aneuploidy associated with the respective chromosomal group is present. Like the training dataset 120, the test dataset 140 includes images labelled with each of the chromosomal groups.

The training set 120 and test set 140 may be generated using images of embryos where PGT-A results and/or pregnancy outcomes (e.g., for implanted embryos) are available which can be used to label the image. Typically the images will be phase contrast microscope images of embryos captured 3-5 days post in-vitro fertilization (IVF). Such images are routinely captured during IVF procedures to assist an embryologist in making a decision on which embryo or embryo to select for implantation. However it is to be understood that other microscope images captured at other times, under other lighting conditions or magnification ranges could be used. In some embodiments a time lapse sequence of images could be used, for example, by combining/concatenating a series of images into a single image which is analyzed by the AI model. Typically the available pool of images will be separated into a large training set with around 90% of the images and a small (the remaining 10%) blind hold-out test set; i.e., the test dataset is not used to train the model. A small percentage, such as 10%, of the training set 120 may also be allocated to a validation dataset. Preferably the relative proportions of each of the chromosomal groups in the test dataset 120 are similar to the relative proportions of each of the chromosomal groups in the training dataset 140 (for example within 10%, and preferably within 5% or lower).

At step 104, we separately train at least one chromosomal group AI model for each chromosomal group using the same training dataset 120 for training all models. Each chromosomal group AI model is trained to identify morphological features in images labelled with the associated chromosomal group label. Additionally or alternatively at least one multi-group AI model may be trained on the training data. Each multi-group AI model is trained to independently identify morphological features in images labelled with each of the associated chromosomal group labels to generate a multi-group output on an input image to indicate whether at least one aneuploidy associated with each of the chromosomal group is present or absent in the image.

At step 105 we then select a best chromosomal group AI model for each of the chromosomal groups or a best multi-group AI model using the test dataset (depending upon what was generated at step 104). In some embodiments, the final selected models will be used to generate further ensemble or knowledge distillation models. At step 106 we deploy the selected AI model to screen embryo images for the presence of one or more aneuploidies.

The approach to building an aneuploidy screening AI model that can detect/predict a broad range of chromosomal deficiencies is thus to break up the problem and train individual targeted AI models for sub-sets of chromosomal deficiencies, and then combine the separate AI models to detect a broader set of chromosomal deficiencies. As noted above each chromosome group will be treated as independent from one another. Each embryo (or embryo image) may have multiple chromosome deficiencies and a single image may be associated with multiple Chromosome Groups. That is a mosaic embryo in which different cells have different aneuploidies can have multiple group label corresponding to each aneuploidy present in the embryo. In each case, the full training data set will be leveraged so that a machine learning model (or Ensemble/Distilled model) will be created. This is repeated multiple times, for each Chromosome Group of interest (as constrained by the quality and total size of the data set to be able to create a machine learning model), so that multiple models that cover different chromosomal modifications can be created from the same training data set. In some cases, the models may be very similar to one another, established from the same 'base' model, but with separate classifiers at the final layer corresponding to each chromosome considered. In other cases, the models may handle only one chromosome individually, and are combined together using the Ensemble method or Distillation method. These scenarios are discussed below in relation to selection of the best model.

Figure 2A:
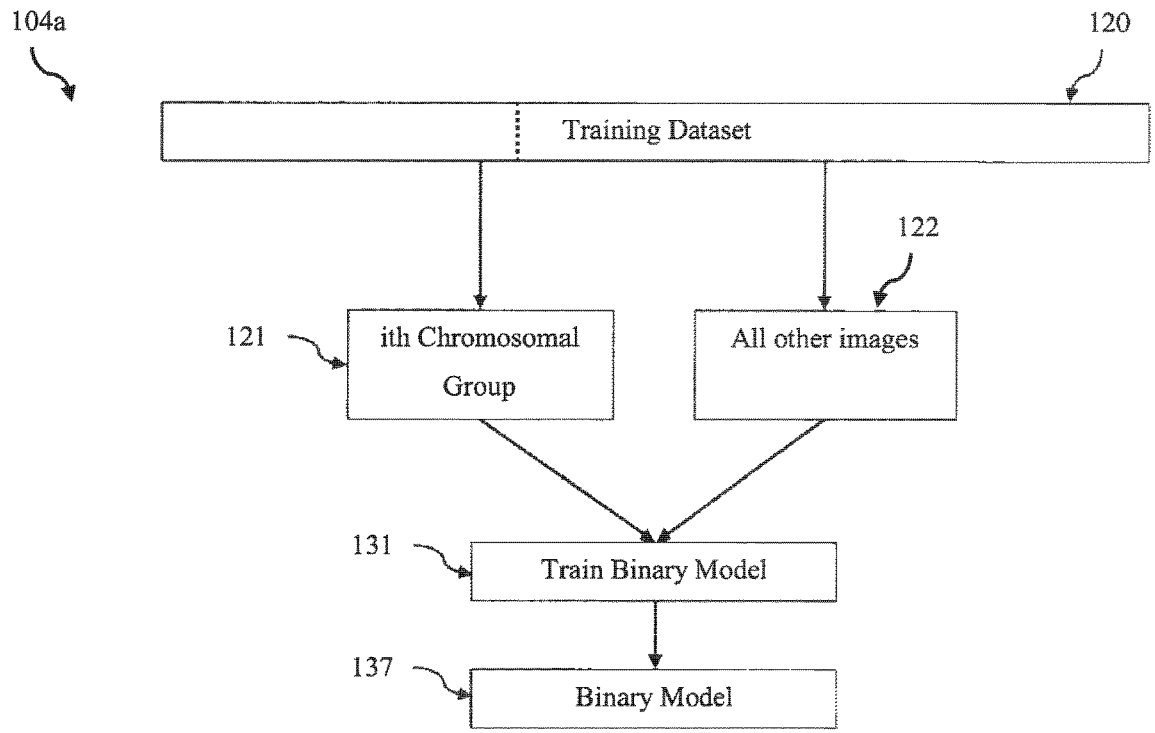
FIG. 2A is a flowchart of the step of training of a binary model according to an embodiment.
Figure 2B:
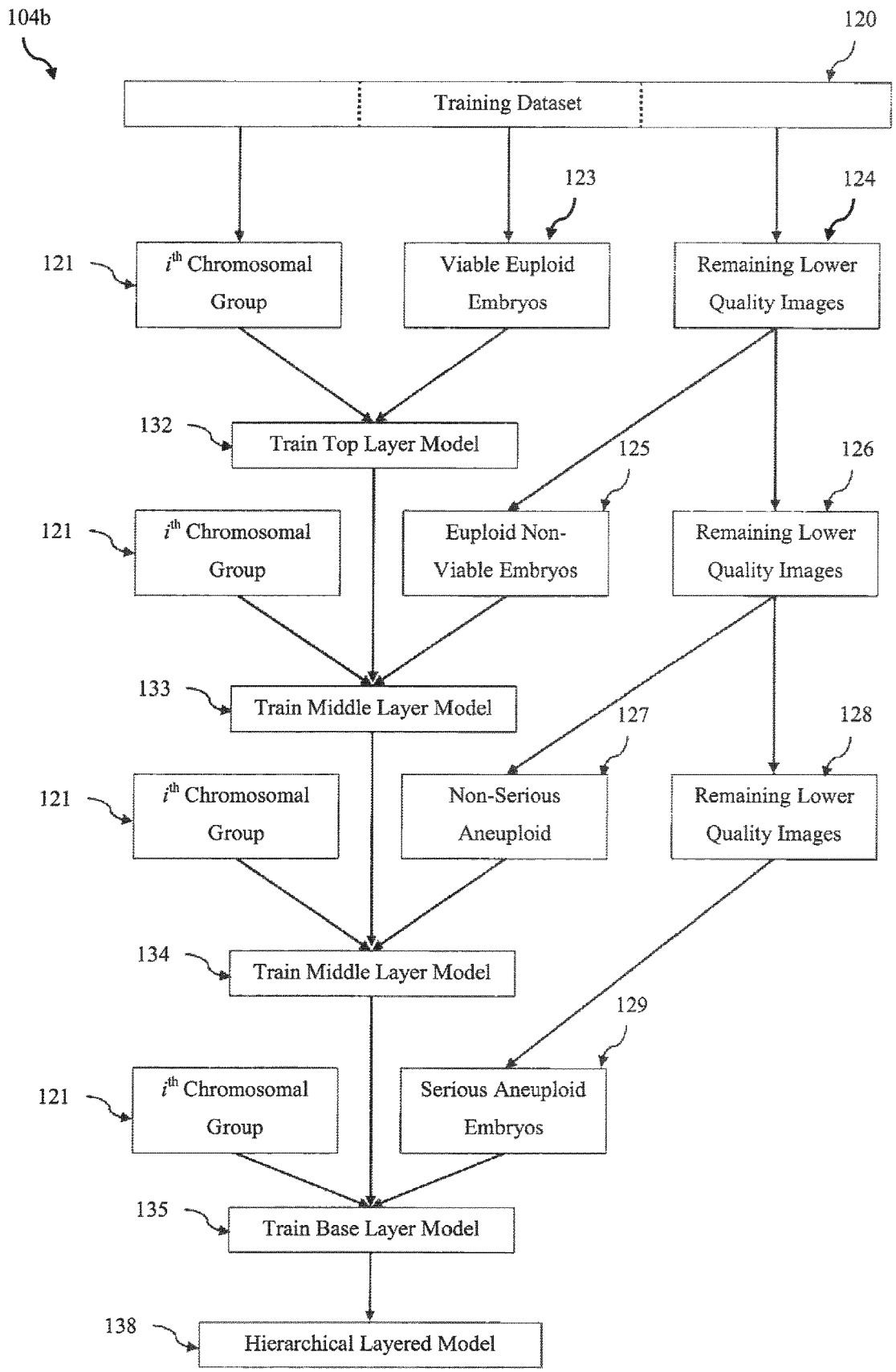
FIG. 2B is a flowchart of the step of training of a hierarchical layered model according to an embodiment.
Figure 2C:
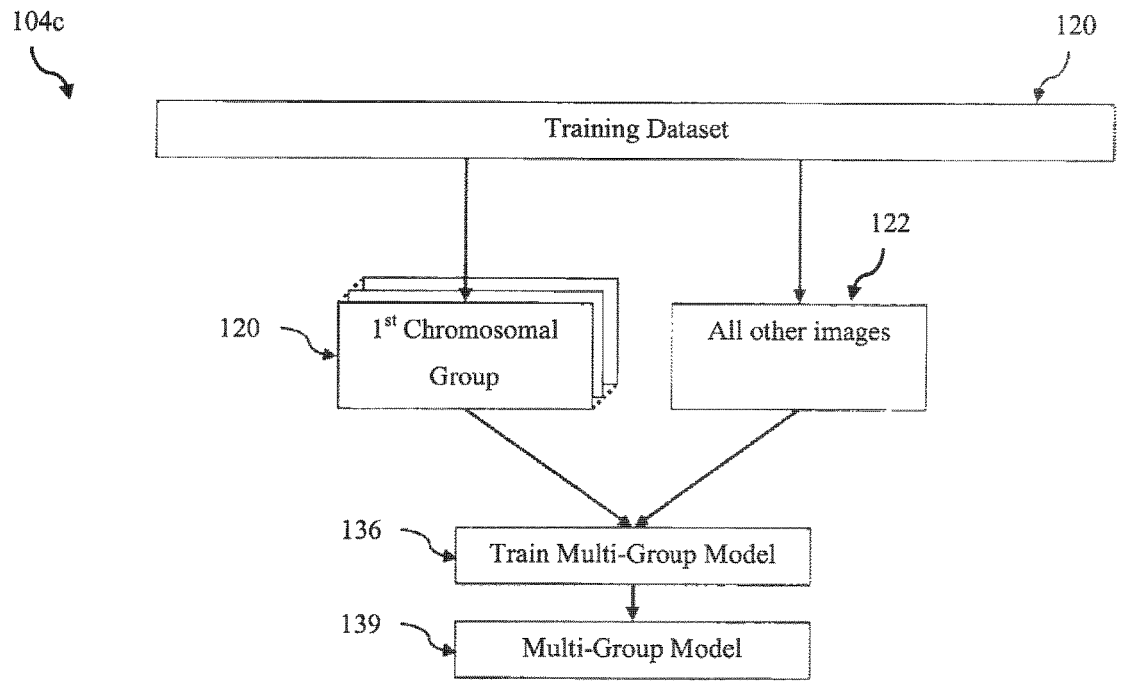
FIG. 2C is a flowchart of the step of training of a multi-class model according to an embodiment.
Figure 2D:
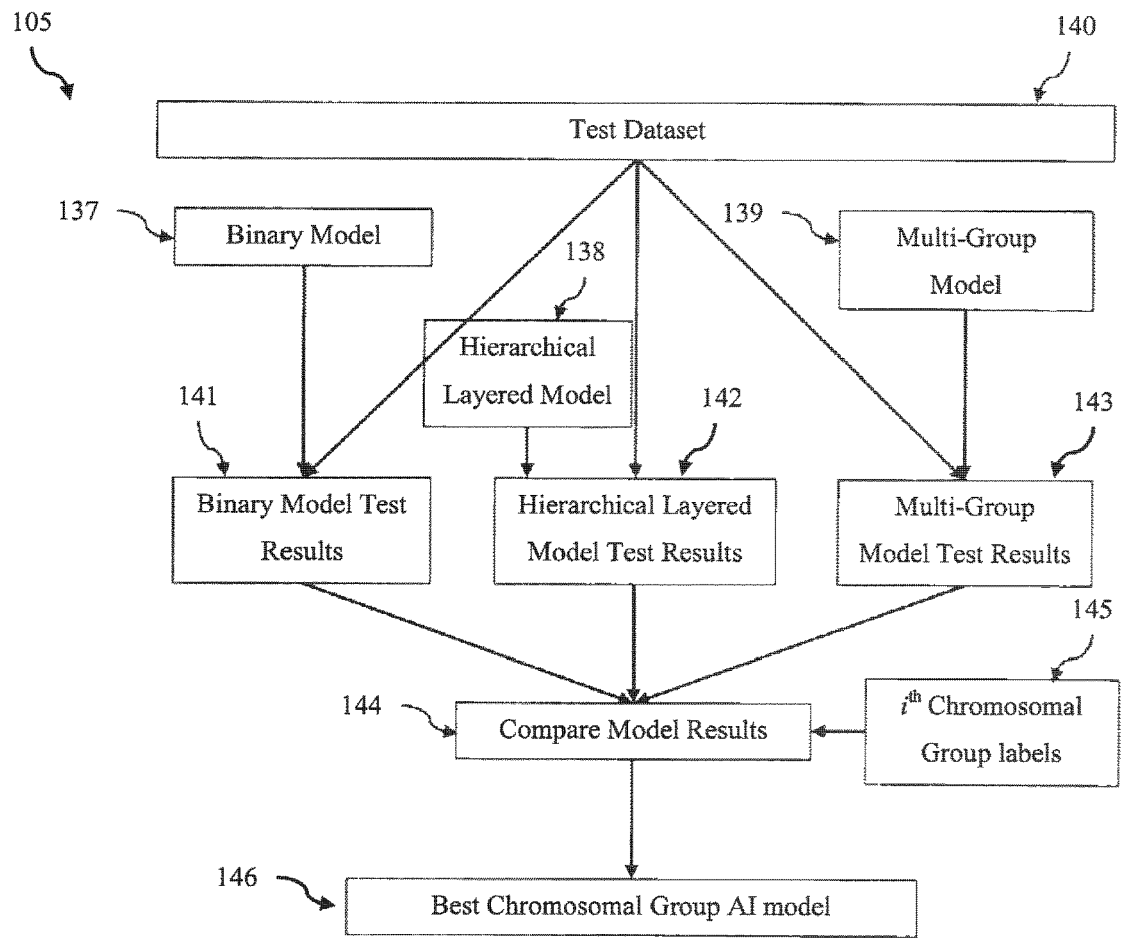
FIG. 2D is a flowchart of the step of selecting a best chromosomal group AI model according to an embodiment.

In one embodiment the step of separately training at least one chromosomal group AI model 103 for each chromosomal group comprises training one or more of a binary model, a hierarchical layered (multi-layer) model, or a single multi-group model for each chromosomal group, and then using the test dataset to select the best model for that chromosomal group. This is further illustrated in FIGS. 2A through 2D and discussed below. FIGS. 2A, 2B and 2C show flowcharts of the step of training of a binary model 137, a hierarchical layered model 138, and a multi-group model 139 according to an embodiment. FIG. 2D is a flowchart of the step of selecting a best chromosomal group AI model 146 using the test dataset 140 according to an embodiment.

FIG. 2A is a flowchart of a step 104a of training a binary model for a chromosomal group. The images in the training set 120 are labelled with a label matching the $i^{th}$ chromosomal group, such as a "present" label (or a "Yes" or 1) to create the $i^{th}$ chromosomal group of images 121. We then label all other images in the training set with an "absent label" (or a "No" or 0) to create the set of all other images 122. We then train a binary model 131 using the present and absent labels (i.e., on the $i^{th}$ chromosomal group 121 and all other images 122) such that the binary model 127 will generate a binary output on an input image to indicate whether the a chromosomal abnormality associated with the $i^{th}$ chromosomal group is present in the image (or not). The presence label will typically indicate presence in at least one cell (e.g., if mosaic), but may also indicate a threshold number of cells in the embryo, or presence in all cells.

FIG. 2B is a flowchart of a step 104*b* of training a hierarchical sequence of layered models for a chromosomal group (the $i^{th}$ chromosomal group 121) which we will refer to as a hierarchical layered model (or a multi-layer model). In this embodiment this comprises training a hierarchical sequence of layered binary models (although as discussed below the requirement for binary models may be relaxed). At each layer, images associated with the $i^{th}$ chromosomal group 121 are assigned a first label and are trained against a second set of images from the training dataset 120, wherein the second set of images are grouped based on a maximum level of quality (quality group). At each sequential layer the second set of images used in training is a subset of images from the second set in the previous layer having a lower quality than the maximum quality of the second set in the previous layer. That is we initially partition the dataset into the images labelled (associated with) the $i^{th}$ Chromosomal group, and the remaining images in the dataset. The remaining images in the dataset are assigned a quality label. Then at each level we divide the current dataset into a first group corresponding to the highest quality level remaining in the dataset and the remaining lower quality image (i.e., the residual group of images). At the next level the previous residual group is further divided into a first group corresponding to the highest quality level in the (residual) dataset and the remaining lower quality images (which becomes the updated residual group of images). This is repeated until we are at the lowest level.

That is second group (or second classification) comprises embryo images of varying levels of quality based on genetic integrity (chromosome deficiencies including mosaicism) and viability (if implanted into the patient, a viable embryo led to a pregnancy and is considered "good"). The rationale behind the hierarchical layered model approach is that embryo images that are considered high quality will likely have the highest quality morphological features in the images with minimal abnormalities (i.e., "will look like the best embryos"), and therefore will have the greatest morphological disparity/difference compared with embryo images comprising chromosome deficiencies (i.e., "will look bad or have abnormal features"), and thus enable the AI algorithms to better detect and predict the morphological features between these two (extreme) classifications of images.

In the embodiment shown in FIG. 2B, we allocate quality labels to each image in the training dataset 120, with the set of quality labels comprises a hierarchical set of quality labels which can be used to partition the training dataset 120 into different quality subsets. Each image has a single quality label. In this embodiment they comprise "viable euploid embryos" 123, "euploid non-viable embryos" 125, "non-serious aneuploid embryos" 127, and "serious aneuploid embryos" 129. In other embodiments they could be risk categories of adverse outcomes, such as very low risk, low risk, medium risk, high risk, or very high risk, or simply low risk, medium risk and high risk. The training dataset is then partitioned into the $i^{th}$ Chromosomal group of interest, and the remaining images as outlined above. We then train a top layer binary model 132 by dividing the training set into a first quality dataset with a "viable euploid embryos" label 123 and another dataset 124 comprising all other images, and training a binary model on images labelled with the $i^{th}$ chromosomal group 121 and images in the first quality dataset 123. We then sequentially train one or more, in this case two, middle layer binary models 132 133, wherein at each middle layer a next quality level dataset is generated from selecting images with labels with the highest quality label in the other dataset, and a binary model is trained on images labelled with the chromosomal group and images in the next quality dataset. Thus we select the "euploid non-viable embryos" 125 from the other lower quality images 124 in the top layer and train the first middle layer model 133 on images from the $i^{th}$ chromosomal group 121 and the "euploid non-viable embryos" 125. The remaining other lower quality images 126 comprises "non-serious aneuploid embryos" 127, and "serious aneuploid embryos" 129. At the next middle layer, again extract the next quality level of images, namely the "non-serious aneuploid embryos" 127 and train another middle layer model 133 on images from the $i^{th}$ chromosomal group 121 and the "non-serious aneuploid embryos" 127. The remaining other lower quality images 128 now comprises the "serious aneuploid embryos" 129. We then train a binary base layer model 135 on images labelled with the $i^{th}$ chromosomal group 121 and images in the other dataset from the previous layer—the "serious aneuploid embryos" 129 images 129. The output of this step is a trained hierarchical layered (binary) model 138 which will generate a binary output on an input image to indicate whether the chromosomal abnormality associated with the $i^{th}$ chromosomal group is present in the image (or not). This can be repeated many times to generate multiple different models for comparison/selection including by varying the number of layers/quality labels (e.g., from 5: (very low risk, low risk, medium risk, high risk, very high risk), to 3 (low risk, medium risk, high risk).

In some embodiments, after training a first binary base level model for a first chromosomal group, we then reuse the "serious aneuploid embryos" 129 images for training each other chromosomal group. That is training a hierarchical layered model comprises training the other chromosomal group against the other dataset ("serious aneuploid embryos" 129) used to train the first binary base level model. In some embodiments, we may skip the middle layers, and simply use a top layer and base layer model (in which case the base layer is trained on images with multiple quality levels, but not "euploid viable embryos" 123).

In the above examples the models are single label models where each label is simply present/absent (with some probability). However in another embodiment the model could also be a multi-class model, in which each independent label comprises multiple independent aneuploidy classes. For example if the group labels are "serious", "medium" or "mild", the labels could each have aneuploidy classes such as ("loss", "gain", "duplication", "deletion", "normal"). It is noted that the group labels are independent so that confidence in a type of aneuploidy in a one chromosomal group doesn't affect the model's confidence in also having also an aneuploidy in another chromosome group, e.g., they could both be high or low confidence. The classes within a label are mutually exclusive such that the probabilities of the different classes within the label will sum to 1 (e.g., you can't have both a loss and a gain on the same chromosome).

Thus the output for each group is the list of probabilities for each class rather than binary/yes output. Further as the labels are independent, different labels/chromosome groups can have different binary/multi-class classes e.g., some could be binary (euploid, aneuploid) and others could be multi-class ("loss", "gain", "duplication", "deletion", "normal"). That is the model is trained to estimate the probability of each aneuploidy classes within a label. That is if there are m classes, the output would be a set of m n yes/no (present/absent or 1/0 values) results (e.g., in a list or similar data structure) probabilities for the classes, as well as an overall probability of the label.

In another embodiment the hierarchical sequence of layered models may be a mixture of multi-class and binary models, or may all be multi-class models. That is with reference to the above discussion we may replace one or more (or all) of the binary models with a multi-class model, which can be trained on a set of chromosomal groups in addition to quality labels. In this respect, the full hierarchical sequence of layered models covers all available group labels available in the training set. However, each model within the sequence may be trained on only a subset of one or more chromosomal groups. In this manner, the top-level model may be trained on a large dataset and triage the dataset into one or more predicted outcomes. A subsequent model in the sequence is then trained on a subset of data pertaining to one of the outcomes, further classifying this set into finer subgroups. This process may be repeated multiple times to create a sequence of models. By repeating this process, and changing which levels uses binary and which levels use multi-class models, as well as the number of different quality labels a range of models can be trained on different subsets of the training dataset.

In another embodiment, the model could be trained as a multi-group model (single or multi-class). That is if there are n chromosomal labels/group, rather than separately train a model for each group, we train a single multi-group model which simultaneously estimates each of the n group labels in a single pass through the data. FIG. 2C is a flowchart of a step 104c of training a single multi-group model 136 for a chromosomal group (the $i^{th}$ chromosomal group 121). We then train a single multi-group model 136 on the training data 120 using the present and absent labels (in the binary case) for each of the chromosomal groups 120 and all other images 122 to generate a multi-group model 139. When presented with an input image, the multi-group model 139 which generate an multi-group output to indicate whether at least one aneuploidy associated with each of the chromosomal groups is present or absent in the image. That is if there are n chromosomal groups, the output would be a set of n yes/no (present/absent or 1/0 values) results (e.g., in a list or similar data structure). In the multi-class case there would additionally be probability estimates for each of the classes in the Chromosomal group. Note that the specific model architecture (e.g., configuration of convolution and pooling layers) will be similar to that for the single chromosomal group models discussed above, but will differ in the output layers at the end, as rather than a binary or multi-class classification for a specific Chromosomal Group, the output layers must generate independent estimates for each Chromosomal Group. This change in the output layers effectively changes the optimization problem, thus giving different performance/outcome compared to a plurality of single Chromosomal group models as discussed above, and thus giving further diversity in Models/results which may assist in finding an optimal overall AI model. Additionally the multi-group model need not estimate/classify all Chromosomal groups and instead we could train several (M>1) multi-group models each of which each estimates/classifies a different subset of the Chromosomal groups. For example if there are n Chromosomal groups, we could separately train M multi-group models where each model simultaneously estimates k groups and M, k and n are integers such that n=M.k. Note however that each multi-group model need not estimate/classify the same number of Chromosomal groups, for example if we train M multi-group models and each multi-group model jointly classifies $k_m$ Chromosomal groups then $n=\Sigma_{m=1 \ldots M} k_m$.

In another embodiment, multi-group models could also be used in the hierarchical layered model approach illustrated in FIG. 2B. That is instead of separately training hierarchical models for each Chromosomal group (e.g., n hierarchical layered models for n Chromosomal groups), we could train a single multi-group model for all Chromosomal groups using the hierarchical approach where the dataset is successively partitioned based on quality level of images remaining in the dataset (and we train new multi-group model at each layer). Additionally we could train several (M>1) multi-group models using the hierarchical approach where each of the multi-group models classifies a different subset of the Chromosomal groups such that all groups are classified by one of the M multi-group models. Further each of the multi-group models may be binary or multi-class models.

FIG. 2D is a flowchart of a step 105 of selecting the best chromosomal group AI model for the $i^{th}$ chromosomal group or the best multi-group model. The test dataset contains images across all the euploid and aneuploid categories selected for training the models. We take the test dataset 140, and provide the (unlabeled) images as input to each of the binary model 137, hierarchical layered model 128 and multi-group model 139 from FIGS. 2A to 2D. We obtain the binary model test results 141, hierarchical layered model test results 142 and multi-group model test results 143 and compared the model results 144 using the $i^{th}$ chromosomal group labels 145. The best performing model is then selected 146, using a selection criteria, such as based on calculating one or more metrics and using one or more of the metrics to compare models with each other. The metric may be chosen from a list of commonly accepted performance metrics, such as (but not limited to): Total Accuracy, Balanced Accuracy, F1 Score, Mean Class Accuracy, Precision, Recall, Log Loss, or a custom confidence or loss metric, such as described below (for example equation (7)). The performance of the models on a set of validation images are measured with respect to the metric, and then the best performing models selected accordingly. These models may be further sorted with a secondary metric, and this process repeated multiple times, until a final model or selection of models (for creating an Ensemble model if desired) is obtained.

The best performing model may be further refined using ensemble or knowledge distillation methods. In one embodiment an Ensemble model for each chromosomal group may be generated by training a plurality of final models, wherein each of the plurality of final models is based on the best chromosomal group AI model for the respective group (or groups if a multi-group model is selected), and each of the plurality of final models is trained on the training dataset with a different set of initial conditions and image ordering. The final ensemble model is obtained by combining the plurality of trained final models according to an ensemble voting strategy, by combining models that exhibit contrasting or complementary behavior according to their performance on one or more metrics from the listed above.

In one embodiment a distillation model for each chromosomal group is generated. This comprises training a plurality of teacher models, wherein each of the plurality of teacher models is based on the best chromosomal group AI model for the respective group (or groups if a multi-group model is selected), and each of the plurality of teacher models is trained on at least part of the training dataset with a different set of initial conditions and image ordering. We then train a student model using the plurality of trained teacher models on the training dataset using a distillation loss function.

This is repeated for each of the chromosomal groups to generate an overall aneuploidy screening AI model 150. Once an aneuploidy screening AI model 150 is trained it may be deployed in a computational system to provide real-time (or near real-time) screen results. FIG. 1B is a flowchart of a method 110 for computationally generating an estimate of the presence of one or more aneuploidies in an image of an embryo using a trained aneuploidy screening AI model according to an embodiment.

At step 111, we generate, in a computational system, an aneuploidy screening AI model 150 according to the above method 100. At step 112 we receive, from a user via a user interface of the computational system, an image containing an embryo captured after in-vitro fertilization. At step 113 we provide the image to the aneuploidy screening AI model 150 to obtain an estimate of the presence of one or more aneuploidies in the image. Then at step 114 we send a report on the presence of one or more aneuploidies in the image to the user via the user interface.

Associated cloud based computational systems configured to computationally generate an aneuploidy screening Artificial Intelligence (AI) model 150 configured to according to the training method 100, and to estimate of the presence of one or more aneuploidies (including presence in a least one cell in the case of mosaicism, or in all cells of the embryo) in an image of an embryo (method 110) may also be provided. This is further illustrated in FIGS. 3, 4, 5A and 5B.

Figure 3:
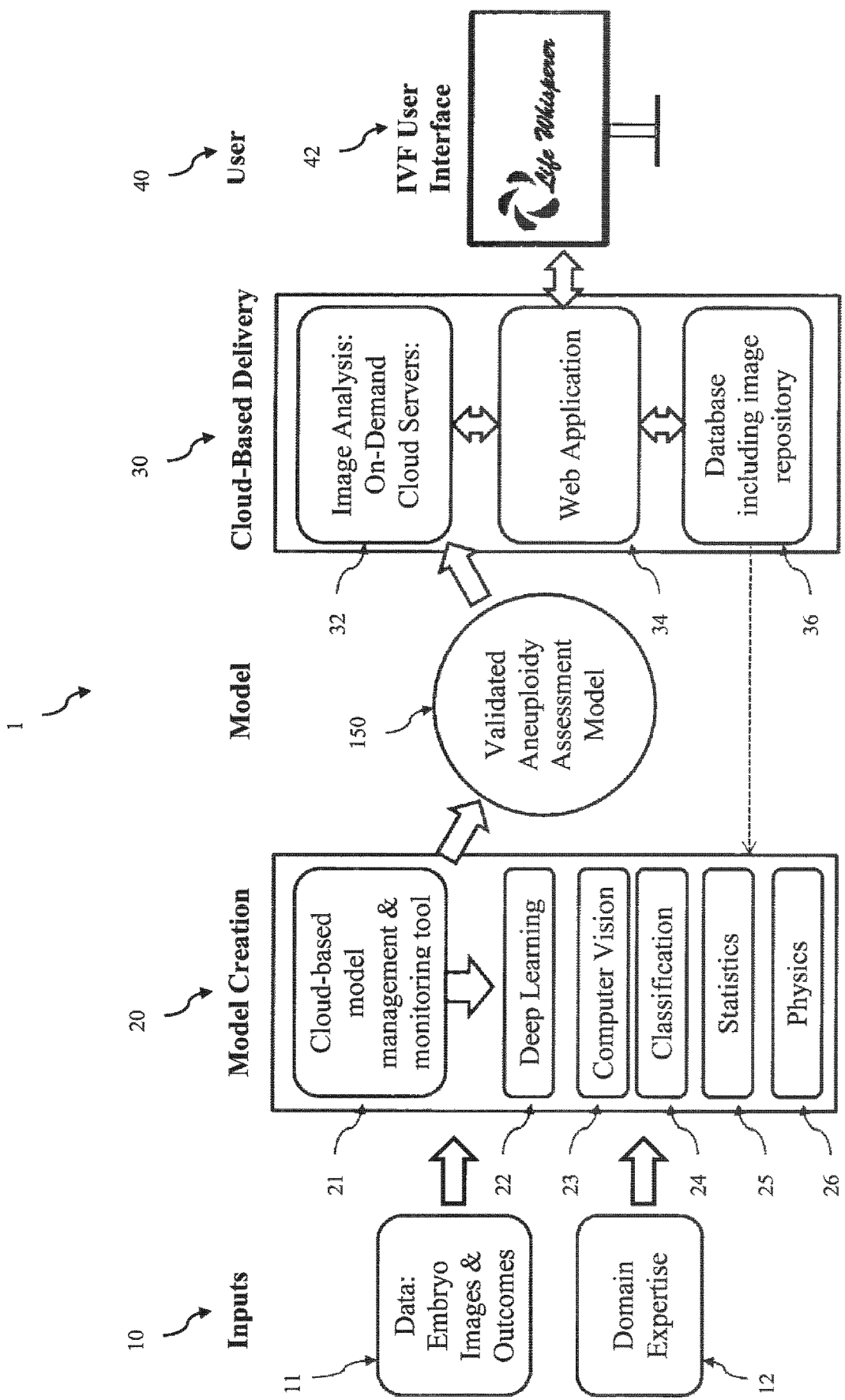
FIG. 3 is a schematic architecture of a cloud based computation system configured to computationally generate and use an aneuploidy screening AI model according to an embodiment.

FIG. 3 is schematic architecture a cloud based computation system 1 configured to computationally generate an aneuploidy screening AI model 150, and then use this model to generate report with an estimate of the presence of one or more aneuploidies in a received image of an embryo. The input 10 comprises data such as the images of the embryo and outcome information (presence of one or more aneuploidies, live birth or not, or successful implantation, etc.) which can be used to generate a labels (classifications). This is provided as input to the model creation process 20 which creates computer vision models and deep learning models, which are combined to generate an aneuploidy screening AI model to analyze the input images. This may also be referred to as an aneuploidy screening Artificial Intelligence (AI) model or aneuploidy screening AI model. A cloud based model management and monitoring tool, which we refer to as the model monitor 21, is used to create (or generate) the AI models. This uses a series of linked services, such as Amazon Web Services (AWS) which manages the training, logging and tracking of models specific to image analysis and the model. Other similar services on other cloud platforms may be used. These may use deep learning methods 22, computer vision methods 23, classification methods 24, statistical methods 25 and physics based models 26. The model generation may also use domain expertise 12 as input, such as from embryologists, computer scientists, scientific/technical literature, etc., for example on what features to extract and use in a Computer Vision model. The output of the model creation process is an instance of an aneuploidy screening AI model which in this embodiment is a validated aneuploidy screening (or embryo assessment) AI model 150. Other aneuploidy screening AI models 150 can be generated using other image data with associated outcome data.

A cloud based delivery platform 30 is used which provides a user interface 42 to the system for a user 40. This is further illustrated with reference to FIG. 4 which is a schematic diagram of an IVF procedure 200 using an aneuploidy screening AI models 150 to assist in selecting an embryo for implantation, or which to reject, or which to subject to invasive PGD testing according to an embodiment. At day 0, harvested eggs are fertilized 202. These are then in-vitro cultured for several days and then an image of the embryo is captured, for example using a phase contrast microscope 204. Preferably the model is trained and used on images of embryos captured on the same day or during a specific time window with reference to a specific epoch. In one embodiment the time is 24 hours, but other time windows such as 12 hours, 36 hours, or 48 hours could be used. Generally smaller time windows of 24 hours or less are preferable to ensure greater similarity in appearance. In one embodiment this could be a specific day which is a 24 hour window starting at the beginning of the day (0:00) to the end of the day (23:39), or specific days such as days 4 or 5 (a 48 hour window starting at the start of day 4). Alternatively the time window could define a window size and epoch, such as 24 hours centered on day 5 (i.e., 4.5 days to 5.5 days). The time window could be open ended with a lower bound, such as at least 5 days. As noted above whilst it is preferable to use images of embryos from a time window of 24 hours around day 5, it is to be understood that earlier stage embryos could be used including day 3 or day 4 images.

Typically several eggs will be fertilized at the same time and thus multiple images will be obtained for consideration of which embryo is the best (i.e., most viable) to implant (which may include identifying which embryo's to exclude due to high risk of serious defects). The user uploads the captured image to the platform 30 via user interface 42, for example using "drag and drop" functionality. The user can upload a single image or multiple images, for example to assist in selection which embryo from a set of multiple embryos being considered for implantation (or which to reject). The platform 30 receives the one or more images 312 which are is stored in a database 36 that includes an image repository. The cloud based delivery platform comprises on-demand cloud servers 32 that are configured to perform image pre-processing (e.g., object detection, segmentation, padding, normalization, cropping, centering, etc.) and then provide the processed image to the trained AI (aneuploidy screening) model 150 which executes on one of the on-demand cloud servers 32 to analyze the image to generate an aneuploidy risk/embryo viability score 314. A report of the outcomes of the model, for example the likelihood of the presence of one or more aneuploidies, or a binary call (use/don't use) or other information obtained from the model is generated 316, and this is sent or otherwise provided to the user 40, such as through the user interface 42. The user (e.g., embryologist) receives the aneuploidy risk/embryo viability scores and report via the user interface and can then use the report (likelihoods) to assist in a decision of whether to implant the embryo, or which is the best embryo in the set to implant. The selected embryo is then implanted 205. To assist in further refinement of the AI model, pregnancy outcome data, such as detection (or not) of a heartbeat in the first ultrasound scan after implantation (normally around 6-10 weeks post fertilization), or aneuploidy results from a PGT-A test may be provided to the system. This allows the AI model to be retrained and updated as more data becomes available.

The image may be captured using a range of imaging systems, such as those found in existing IVF clinics. This has the advantage of not requiring IVF clinics to purchase new imaging systems or use specific imaging systems. Imaging systems are typically light microscopes configured to capture single phase contrast images embryos. However it will be understood that other imaging systems may be used, in particular optical light microscope systems using a range of imaging sensors and image capture techniques. These may include phase contrast microscopy, polarized light microscopy, differential interference contrast (DIC) microscopy, dark-field microscopy, and bright field microscopy. Images may be captured using a conventional optical microscope fitted with a camera or image sensor, or the image may be captured by a camera with an integrated optical system capable of taking a high resolution or high magnification image, including smart phone systems. Image sensors may be a CMOS sensor chip or a charge coupled device (CCD), each with associated electronics. The optical system may be configured to collect specific wavelengths or use filters including band pass filters to collect (or exclude) specific wavelengths. Some image sensors may be configured to operate or sensitive to light in specific wavelengths, or at wavelengths beyond the optical range including in the Infrared (IR) or near IR. In some embodiments the imaging sensor is a multispectral camera which collects an image at multiple distinct wavelength ranges. Illumination systems may also be used illuminate the embryo with light of a particular wavelength, in a particular wavelength band, or a particular intensity. Stops and other components may be used to restrict or modify illumination to certain parts of the image (or image plane).

Further the image used in embodiments described herein may be sourced from video and time lapse imaging systems. A video stream is a periodic sequence of image frames where the interval between image frames is defined by the capture frame rate (e.g., 24 or 48 frames per second). Similarly a time-lapse system captures a sequence of images with a very slow frame rate (e.g., 1 image per hour) to obtain a sequence of images as the embryo grows (post-fertilization). Accordingly it will be understood that the image used in embodiments described herein may be a single image extracted from a video stream or a time lapse sequence of images of an embryo. Where an image is extracted from a video stream or a time lapse sequence, the image to use may be selected as the image with a capture time nearest to a reference time point such as 5.0 or 5.5 days post fertilization.

In some embodiments pre-processing may include an image quality assessment so that an image may be excluded if it fails a quality assessment. A further image may be captured if the original image fails a quality assessment. In embodiments where the image is selected from a video stream or time lapse sequence, then the image selected is the first image which passes the quality assessment nearest the reference time. Alternatively a reference time window may be defined, (e.g., 30 minutes following the start of day 5.0) along with image quality criteria. In this embodiment the image selected is the image with the highest quality during the reference time window is selected. The image quality criteria used in performing quality assessment may be based on a pixel color distribution, a brightness range, and/or an unusual image property or feature that indicates poor quality or equipment failure. The thresholds may be determined by analyzing a reference set of images. This may be based on manual assessment or automated systems which extract outliers from distributions.

Figure 5A:
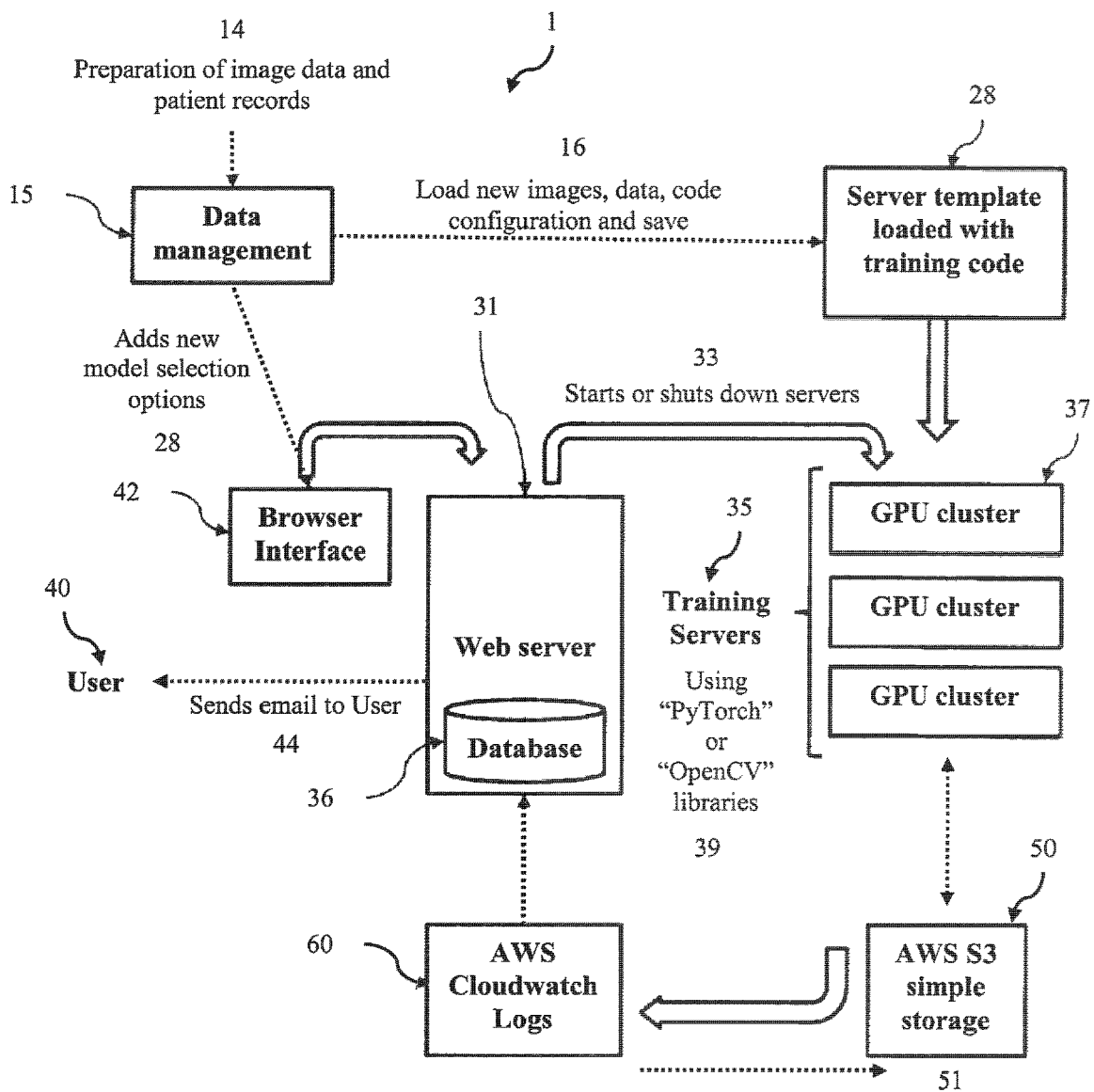
FIG. 5A is schematic flow chart of the generation of the aneuploidy screening model using a cloud based computation system according to an embodiment.
Figure 5B:
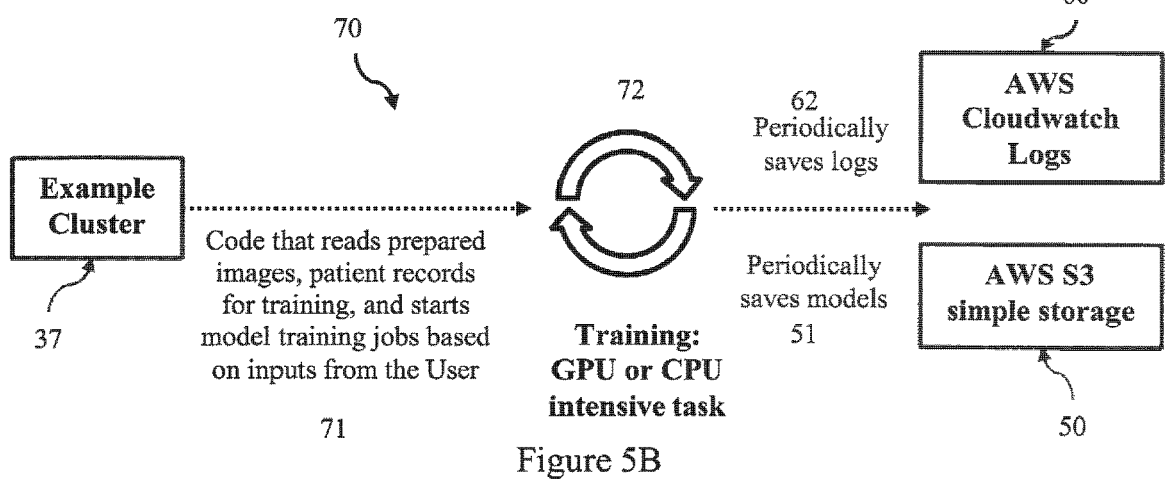
FIG. 5B is a schematic flowchart of a model training process on a training server according to an embodiment.

The generation of the aneuploidy screening AI model 150 can be further understood with reference to FIG. 5A which is schematic flow chart of the generation of the aneuploidy screening AI model 150 using a cloud based computation system 1 configured to generate and use an AI model 100 configured to estimate the presence of aneuploidy (including mosaicism) in a image according to an embodiment. With reference to FIG. 5B this generation method is handled by the model monitor 21.

The model monitor 21 allows a user 40 to provide image data and metadata 14 to a data management platform which includes a data repository. A data preparation step is performed, for example to move the images to specific folder, and to rename and perform pre-processing on the image such as objection detection, segmentation, alpha channel removal, padding, cropping/localizing, normalizing, scaling, etc. Feature descriptors may also be calculated, and augmented images generated in advance. However additional pre-processing including augmentation may also be performed during training (i.e., on the fly). Images may also undergo quality assessment, to allow rejection of clearly poor images and allow capture of replacement images. Similarly patient records or other clinical data is processed (prepared) to extra a viability classification (e.g., viable or non-viable, aneuploidy presence and type) which is linked or associated with each image to enable use in training the machine learning and deep learning models. The prepared data is loaded 16 onto a cloud provider (e.g., AWS) template server 28 with the most recent version of the training algorithms. The template server is saved, and multiple copies made across a range of training server clusters 37 (which may be CPU, GPU, ASIC, FPGA or TPU (Tensor Processing Unit)-based) which form training servers 35.

The model monitor web server 31 then applies for a training server 37 from a plurality of cloud based training servers 35 for each job submitted by the user 40. Each training server 35 runs the pre-prepared code (from template server 28) for training an AI model, using a library such as Pytorch, Tensorflow or equivalent, and may use a computer vision library such as OpenCV. PyTorch and OpenCV are open-source libraries with low-level commands for constructing CV machine learning models.

The training servers 37 manage the training process. This may include dividing the images in to training, validation, and blind validation sets, for example using a random allocation process. Further during a training-validation cycle the training servers 37 may also randomize the set of images at the start of the cycle so that each cycle a different subset of images are analyzed, or are analyzed in a different ordering. If pre-processing was not performed earlier or was incomplete (e.g., during data management) then additional pre-processing may be performed including object detection, segmentation and generation of masked data sets (e.g., just IZC images), calculation/estimation of CV feature descriptors, and generating data augmentations. Pre-processing may also include padding, normalizing, etc., as required. That is the pre-processing step 102 may be performed prior to training, during training, or some combination (i.e., distributed pre-processing). The number of training servers 35 being run can be managed from the browser interface. As the training progresses, logging information about the status of the training is recorded 62 onto a distributed logging service such as Cloudwatch 60. Key patient and accuracy information is also parsed out of the logs and saved into a relational database 36. The models are also periodically saved 51 to the data storage (e.g., AWS Simple Storage Service (S3) or similar cloud storage service) 50 so they can be retrieved and loaded at a later date (for example to restart in case of an error or other stoppage). The user 40 is sent email updates 44 regarding the status of the training servers if their jobs are complete, or an error is encountered.

Within each training cluster 37, a number of processes take place. Once a cluster is started via the web server 31, a script is automatically run, which reads the prepared images and patient records, and begins the specific Pytorch/OpenCV training code requested 71. The input parameters for the model training 28 are supplied by the user 40 via the browser interface 42 or via configuration script. The training process 72 is then initiated for the requested model parameters, and can be a lengthy and intensive task. Therefore, so as not to lose progress while the training is in progress, the logs are periodically saved 62 to the logging (e.g., AWS Cloudwatch) service 60, and the current version of the model (while training) is saved 51 to the data (e.g., S3) storage service 51 for later retrieval and use. An embodiment of a schematic flowchart of a model training process on a training server is shown in FIG. 5B. With access to a range of trained AI models on the data storage service, multiple models can be combined together for example using ensemble, distillation or similar approaches in order to incorporate a range of deep learning models (e.g., PyTorch) and/or targeted computer vision models (e.g., OpenCV) to generate a more robust aneuploidy screening AI model 100 which is provide to the cloud based delivery platform 30.

Figure 4:
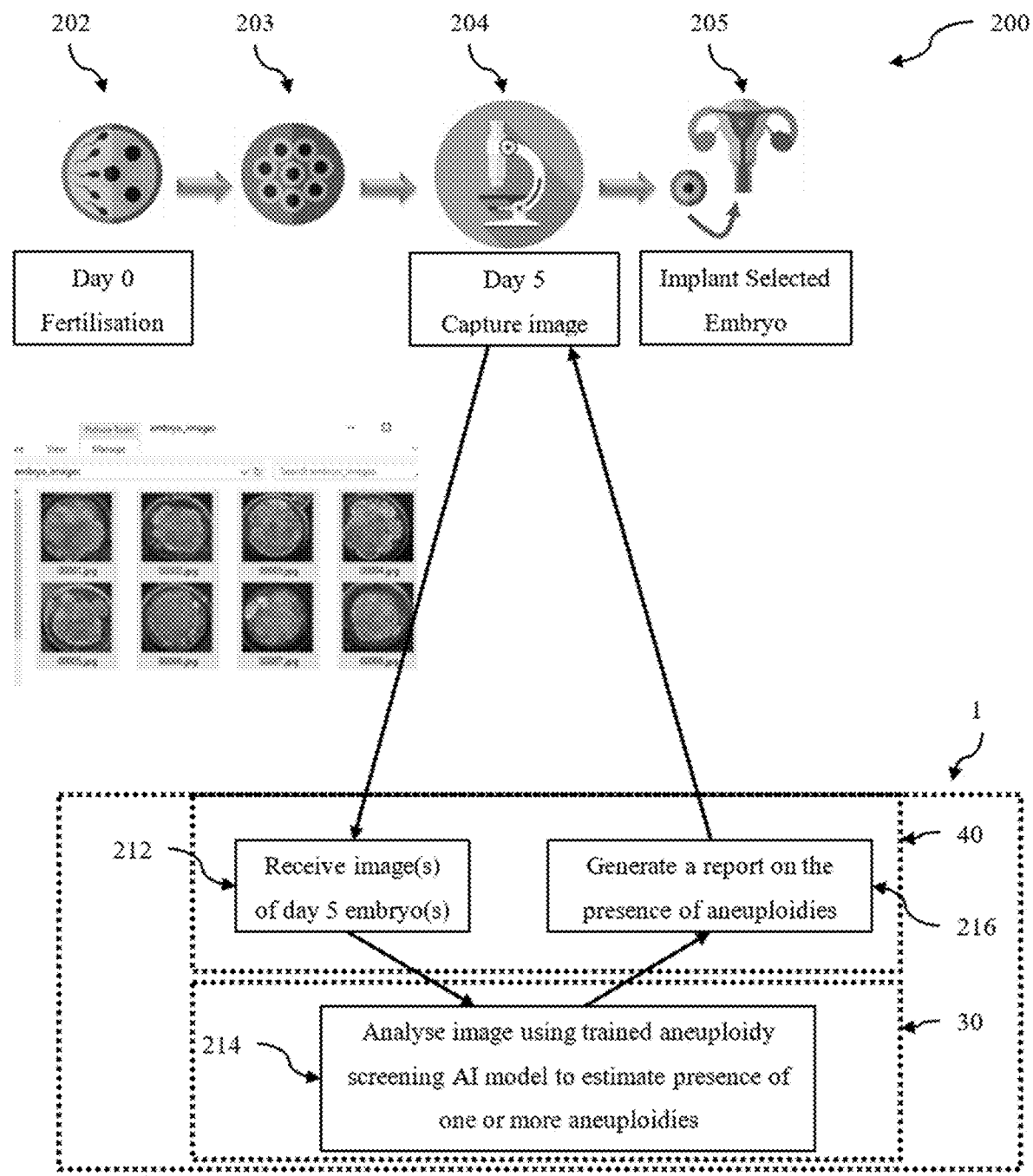
FIG. 4 is a schematic diagram of an IVF procedure using the aneuploidy screening AI model to assist in selecting an embryo for implantation according to an embodiment.

The cloud-based delivery platform (or system) 30 then allows users 10 to drag and drop images directly onto the web application 34, which prepares the image and passes the image to the trained/validated aneuploidy screening AI model 30 to obtain a viability score (or aneuploidy risk) which is immediately returned in a report (as illustrated in FIG. 4). The web application 34 also allows clinics to store data such as images and patient information in database 36, create a variety of reports on the data, create audit reports on the usage of the tool for their organization, group or specific users, as well as billing and user accounts (e.g., create users, delete users, reset passwords, change access levels, etc.). The cloud-based delivery platform 30 also enables product admin to access the system to create new customer accounts and users, reset passwords, as well as access to customer/user accounts (including data and screens) to facilitate technical support.

The various steps and variations in generation of embodiments of an AI model configured to estimate an aneuploidy risk/embryo viability score from an image will now be discussed in further detail. With reference to FIG. 3, the model is trained and uses images captured 5 days post fertilization (i.e., a 24 hour period from day 5:00:00 to day 5:23:59). However as noted above effective models can still be developed using a shorter time window such as 12 hours, a longer time window 48 hours, or even no time window (i.e., open ended). Further images may be taken at other days such as day 1, 2, 3 or 4, or a minimum time period after fertilization such as at least 3 days or at least 5 days (e.g., open ended time window). However it is generally preferable (but not strictly necessary) that images used for training of an AI model, and then subsequent classification by the trained AI model, are taken during similar and preferably the same time windows (e.g., the same 12, 24, or 48 hour time window).

Prior to analysis, each image undergoes pre-processing (image preparation). A range of pre-processing steps or techniques may be applied. The may be performed after adding to the data store 14 or during training by a training server 37. In some embodiments an objection detection (localization) module is used to detect and localize the image on the embryo. Objection detection/localization comprises estimating the bounding box containing an embryo. This can be used for cropping and/or segmentation of the image. The image may also be padded with a given boundary, and then the color balance and brightness are normalized. The image is then cropped so that the outer region of the embryo is close to the boundary of the image. This is achieved using computer vision techniques for boundary selection, including the use of AI object detection models.

Image segmentation is a computer vision technique that is useful for preparing the image for certain models to pick out relevant areas for the model training to focus on such as the IntraZonal Cavity (IZC), individual cells within an embryo (i.e., cell boundaries to assist in identifying mosaicism) or other regions such as Zona Pellucida. As outlined above mosaicism occurs where different cells in an embryo possess different sets of chromosomes. That is mosaic embryo is a mixture of euploid (chromosomally normal) and aneuploid cells (excess/deletion/modification of chromosomes) and there may be multiple distinct aneuploidies present, and in some cases no euploid cells may be present. Segmentation may be used to identify the IZC or cell boundaries and thus segment an embryo into individual cells. In some embodiments multiple masked (augmented) images of an embryo are generated in which each image is masked except for a single cell. The image may also be masked to generate images of just the IZC and thus exclude the Zona Pellucida and background, or these may be left in in the image. Aneuploidy AI models may then be trained using masked images, for example IZC images which are masked to just contain the IZC or masked to identify individual cells in an embryo. Scaling involves rescaling the image to a predefined scale to suit the particular model being trained. Augmentation involves incorporating making small changes to a copy of the images, such as rotations of the image in order to control for the direction of the embryo dish. The use of segmentation prior to deep learning was found to have a significant effect on the performance of the deep learning method. Similarly augmentation was important for generating a robust model.

A range of image pre-processing techniques may be used to prepare the embryo images for analysis, for example to ensure images are standardized. Examples include:

Alpha Channel Stripping comprises stripping an image of an alpha channel (if present) to ensure it is coded in a 3-channel format (e.g., RGB), for example to remove transparency maps;

Padding/Bolstering each image with a padded border, to generate a square aspect ratio, prior to segmentation, cropping or boundary-finding. This process ensured that image dimensions were consistent, comparable, and compatible for deep learning methods, which typically require square dimension images as input, while also ensuring that no key components of the image were cropped;

Normalizing the RGB (red-green-blue) or gray-scale images to a fixed mean value for all the images. For example this includes taking the mean of each RGB channel, and dividing each channel by its mean value. Each channel was then multiplied by a fixed value of 100/255, in order to ensure the mean value of each image in RGB space was (100, 100, 100). This step ensured that color biases among the images were suppressed, and that the brightness of each image was normalized;

Thresholding images using binary, Otsu, or adaptive methods. Includes morphological processing of the image using dilation (opening), erosion (closing) and scale gradients, and using a scaled mask to extract the outer and inner boundaries of a shape;

Object Detection/Cropping the image to localize the image on the embryo and ensure that there are no artefacts around the edges of the image. This may be performed using an Object Detector which uses an object detection model (discussed below) which is trained to estimate a bounding box which contains the main feature of the image, such as an embryo (IZC or Zona Pellucida), so that the image is a well-centered and cropped embryo;

Extracting the geometric properties of the boundaries using an elliptical Hough transform of the image contours, for example the best ellipse fit from an elliptical Hough transform calculated on the binary threshold map of the image. This method acts by selecting the hard boundary of the embryo in the image, and by cropping the square boundary of the new image so that the longest radius of the new ellipse is encompassed by the new image width and height, and so that the center of the ellipse is the center of the new image;

Zooming the image by ensuring a consistently centered image with a consistent border size around the elliptical region;

Segmenting the image to identify the cytoplasmic Intra-Zonal Cavity (IZC) region, Zona Pellucida region and/or cell boundaries. Segmentation may be performed by calculating the best-fit contour around an un-elliptical image using a Geometrical Active Contour (GAC) model, or morphological snake, within a given region. The inner and other regions of the snake can be treated differently depending on the focus of the trained model on the cytoplasmic IntraZonal Cavity (IZC) that may contain a blastocyst, or cells within a blastocyst. Alternatively a Semantic Segmentation model may be trained which identifies a class for each pixel in an image. For example a semantic segmentation model could be developed using a U-Net architecture with a pre-trained ResNet-50 encoder and trained using a BinaryCrossEntropy loss function to segment the background, Zona Pellucida and IZC, or segment cells within the IZC;

Annotating the image by selecting feature descriptors, and masking all areas of the image except those within a given radius of the descriptor key point;

Resizing/scaling the entire set of images to a specified resolution.

Tensor conversion comprising transforming each image to a tensor rather than a visually displayable image, as this data format is more usable by deep learning models. In one embodiment, Tensor normalization is obtained from standard pre-trained ImageNet values, for example with a mean: (0.485, 0.456, 0.406) and standard deviation (0.299, 0.224, 0.225).

In another embodiment an object detector uses an object detection model which is trained to estimate a bounding box which contains the embryo. The goal of object detection is to identify the largest bounding box that contains all of the pixels associated with that object. This requires the model to both model the location of an object and a category/label (i.e., what's in the box) and thus detection models typically contain both an object classifier head and a bounding box regression head.

One approach is Region-Convolutional Neural Net (or R-CNN) which uses an expensive search process is applied to search for image patch proposals (potential bounding boxes). These bounding boxes are then used to crop the regions of the image of interest. The cropped images are then run through a classifying model to classify the contents of the image region. This process is complicated and computationally expensive. An alternative is Fast-CNN which uses a CNN that proposed feature regions rather a search for image patch proposals. This model uses a CNN to estimate a fixed number of candidate boxes, typically set to be between 100 and 2000. An even faster alternative approach is Faster-RCNN which uses anchor boxes to limit the search space of required boxes. By default, a standard set of 9 anchor boxes (each of different size) is used. Faster-RCNN. This uses a small network which jointly learns to predict the feature regions of interest, and this can speed up the runtime compared to R-CNN or Fast-CNN as expensive region search can be replaced.

For every feature activation coming out of the back one model is considered anchor point (Red in the image below). For every anchor point, the 9 (or more, or less, depending on problem) anchor boxes are generated. The anchor boxes correspond to common object sizes in the training dataset. As there are multiple anchor points with multiple anchor boxes, this results in 10 s of thousands of region proposals. The proposals are then filtered via a process called Non-Maximal Suppression (NMS) that selects the largest box that has confident smaller boxes contained within it. This ensures that there is only 1 box for each object. As the NMS is relies on the confidence of each bounding box prediction, a threshold must be set for when to consider objects as part of the same object instance. As the anchor boxes will not fit the objects perfectly, the job of the regression head is to predict the offsets to these anchor boxes which morph them into the best fitting bounding box.

The detector can also specialize and only estimate boxes for a subset of objects e.g., only people for pedestrian detectors. Object categories that are not of interest are encoded into the 0-class which corresponds with the background class. During training, patches/boxes for the background class are usually sampled at random from image regions which contain no bounding box information. This step allows the model to become invariant to those undesirable objects e.g., it can learn to ignore them rather than classifying them incorrectly. Bounding boxes are usually represented in two different formats: The most common is (x1, y1, x2, y2) where the point p1=(x1, y1) is the top left hand corner of the box and p2=(x2, y2) is the bottom right hand side. The other common box format is (cx, cy, height, width), where the bounding box/rectangle is encoded as a center point of the box (cx, cy) and the box size (height, width). Different detection methods will use different encodings/formats depending on the task and situation.

The regression head may be trained using a L1 loss and the classification head may be trained using a CrossEntropy loss. An objectness loss may also be used (is this background or an object) as well The final loss is computed as the sum of these losses. The individual losses may also be weighted such as:

$$\text{loss} = \lambda_1 \text{regression\_loss} + \lambda_2 \text{classification\_loss} + \lambda_3 \text{objectness\_loss} \quad (1)$$

In one embodiment, an embryo detection model based upon Faster-RNN was used. In this embodiment approximately 2000 images were hand labelled with the ground truth bounding boxes. The boxes were labelled such that the full embryo, including the Zona Pellucida region, was inside the bounding box. In the cases of there being more than one embryo present, a.k.a. Double transfer, both embryos were labelled in order to allow the model to differentiate between double transfer and single transfer. As it is impossible to reconcile which embryo is which in a double transfer, then the model was configured to raise an error to the use if a double transfer was detected. Models with multiple 'lobes' are labelled as being a single embryo.

As an alternative to GAC segmentation, semantic segmentation may be used. Semantic Segmentation is the task of trying to predict a category or label for every pixel. Tasks like semantic segmentation are referred to as pixel-wise dense prediction tasks as an output is required for every input pixel. Semantic segmentation models are setup differently to standard models as they require a full image output. Typically, a semantic segmentation (or any dense prediction model) will have an encoding module and a decoding module. The encoding module is responsible for create a low-dimensional representation of the image (sometimes called a feature representation). This feature representation is then decoded into the final output image via the decoding module. During training, the predicted label map (for semantic segmentation) is then compared against the ground truth label maps that assign a category to each pixel, and the loss is computed. The standard loss function for Segmentation models is either BinaryCrossEntropy, standard CrossEntopy loss (depending on if the problem is multi-class or not). These implementations are identical to their image classification cousins, except that the loss is applied pixel wise (across the image channel dimension of the tensor).

The Fully Convolutional Network (FCN) style architecture is commonly used in the field for generic semantic segmentation tasks. In this architecture, a pre-trained model (such as a ResNet) is first used to encode a low resolution image (at approx. 1/32 of the original resolution, but can be 1/8 if dilated convolutions are used). This low resolution label map is then up-sampled to the original image resolution and the loss is computed. The intuition behind predicted a low resolution label map, is that semantic segmentation masks are very low frequency and do not need all the extra parameters of a larger decoder. More complicated versions of this model exist, which use multi-stage up sampling to improve segmentation results. Simply stated, the loss is computed at multiple resolutions in a progressive manner to refine the predictions at each scale.

One down side of this type of model, is that if the input data is high resolution, or contains high frequency information (i.e., smaller/thinner objects), the low-resolution label map will fail to capture these smaller structures (especially when the encoding model does not use dilated convolutions). In a standard encoder/Convolutional Neural Network, the input image/image features are progressively down sampled as the model gets deeper. However, as the image/features are down sampled key high frequency details can be lost. Thus to address this, an alternative U-Net architecture may be used that instead uses skip connections between the symmetric components of the encoder and decoder. Simply put, every encoding block has a corresponding block in the decoder. The features at each stage are then passed to the decoder alongside the lowest resolution feature representation. For each of the decoding blocks, the input feature representation is up sampled to match the resolution of its corresponding encoding block. The feature representation from the encoding block and the up sampled lower resolution features are then concatenated and passed through a 2D convolution layer. By concatenating the features in this way, the decoder can learn to refine the inputs at each block, choosing which details to integrate (low-res details or high-res details) depending on its input. The main difference between FCN style models and U-Net style models is that in the FCN model, the encoder is responsible for predicting a low resolution label map that is then up sampled (possibly progressively). Whereas, the U-Net model does not have a fully complete label map prediction until the final layer. Ultimately, there do exist many variants of these models that trade off the differences between them (e.g., Hybrids). U-net architectures may also use pre-trained weights, such as ResNet-18 or ResNet-50, for use in cases where there is insufficient data to train models from scratch.

In some embodiments segmentation was performed using U-Net architecture with pre-trained ResNet-50 encoder trained using BinaryCrossEntropy to identify the Zona Pellucida region, the IntraZonal Cavity region, and/or cell boundaries. Once segmented, images sets could be generated in which all regions other than a desired region were masked. AI Models could then be trained on these specific image sets. That is AI models could be separated into two groups: first, those that included additional image segmentation, and second those that required the entire unsegmented image. Models that were trained on images that masked the IZC, exposing the zona region, were denoted as Zona models. Models that were trained on images that masked the Zona (denoted IZC models), and models that were trained on full-embryo images (i.e., second group), were also considered in training.

In one embodiment, to ensure uniqueness of each image, so that copies of records do not bias the results, the name of the new image is set equal to the hash of the original image contents, as a png (lossless) file. When run, the data parser will output images in a multi-threaded way, for any images that do not already exist in the output directory (which, if it doesn't exist, will create it), so if it is a lengthy process, it can be restarted from the same point even if it is interrupted. The data preparation step may also include processing the metadata to remove images associated with inconsistent or contradictory records, and identify any mistaken clinical records. For example a script may be run on a spreadsheet to conform the metadata into a predefined format. This ensures the data used to generate and train the models is of high quality, and has uniform characteristics (e.g., size, color, scale etc.).

Once the data is suitably prepared it can then be used to train the AI models as discussed above. In one embodiment a plurality of computer vision (CV) models are generated using machine learning method and a plurality of deep learning models using a deep learning method. The deep learning models may be trained on full embryo images or masked image sets. The computer vision (CV) models may be generated using a machine learning method using a set feature descriptors calculated from each image. Each of the individual models are configured to estimate a likelihood such as an aneuploidy risk/embryo viability score of an embryo in an image, and the AI model combines selected models to produce an overall aneuploidy risk/embryo viability score, or similar overall likelihood or hard classification. Models generated on individual chromosomal groups may be improved using ensemble and knowledge distillation techniques. Training is performed using randomized datasets. Sets of complex image data, can suffer from uneven distribution, especially if the data set is smaller than around 10,000 images, where exemplars of key viable or non-viable embryos are not distributed evenly through the set. Therefore, several (e.g., 20) randomizations of the data are considered at one time, and then split into the training, validation and blind test subsets defined below. All randomizations are used for a single training example, to gauge which exhibits the best distribution for training. As a corollary, it is also beneficial to ensure that the ratio between the number of viable and non-viable embryos is the same across every subset. Embryo images are quite diverse, and thus ensuring even distribution of images across test and training sets can be used to improve performance. Thus after performing a randomization the ratio of images with a viable classification to images with a non-viable classification in each of the training set, validation set and blind validation set is calculated and tested to ensure that the ratios are similar. For example this may include testing if the range of the ratios is less than a threshold value, or within some variance taking into account the number of images. If the ranges are not similar then the randomization is discarded and a new randomization is generated and tested until a randomization is obtained in which the ratios are similar. More generally if the outcome is a n-ary outcome having n states then after randomization is performed the calculation step may comprise calculating the frequency of each of the n-ary outcome states in each of the training set, validation set and blind validation set, and testing that the frequencies are similar, and if the frequencies are not similar then discarding the allocation and repeating the randomization until a randomization is obtained in which the frequencies are similar.

Training further comprises performing a plurality of training-validation cycles. In each train-validate cycle each randomization of the total useable dataset is split into typically 3 separate datasets known as the training, validation and blind validation datasets. In some variants more than 3 could be used, for example the validation and blind validation datasets could be stratified into multiple sub test sets of varying difficulty.

The first set is the training dataset and comprises at least 60% and preferably 70-80% of images: These images are used by deep learning models and computer vision models to create an aneuploidy screening AI model to accurately identify viable embryos. The second set is the Validation dataset, which is typically around (or at least) 10% of images: This dataset is used to validate or test the accuracy of the model created using the training dataset. Even though these images are independent of the training dataset used to create the model, the validation dataset still has a small positive bias in accuracy because it is used to monitor and optimize the progress of the model training. Hence, training tends to be targeted towards models that maximize the accuracy of this particular validation dataset, which may not necessarily be the best model when applied more generally to other embryo images. The third dataset is the Blind validation dataset which is typically around 10-20% of the images. To address the positive bias with the validation dataset described above, a third blind validation dataset is used to conduct a final unbiased accuracy assessment of the final model. This validation occurs at the end of the modelling and validation process, when a final model has been created and selected. It is important to ensure that the final model's accuracy is relatively consistent with the validation dataset to ensure that the model is generalizable to all embryos images. The accuracy of the validation dataset will likely be higher than the blind validation dataset for the reasons discussed above. Results of the blind validation dataset are a more reliable measure of the accuracy of the model.

In some embodiments pre-processing the data further comprises augmenting images, in which a change is made to the image. This may be performed prior to training, or during training (i.e., on the fly). Augmentation may comprise directly augmenting (altering) and image or by making a copy of an image with a small change. Any number of augmentations may be performed with varying amounts of 90 degree rotations of the image, mirror, flip, a non-90 degree rotation, where a diagonal border is filled in to match a background color, image blurring, adjusting an image contrast using an intensity histogram, and applying one or more small random translations in both the horizontal and/or vertical direction, random rotations, JPEG or compression noise, random image resizing, random hue jitter, random brightness jitter, contrast limited adaptive histogram equalization, random flip/mirror, image sharpening, image embossing, random brightness and contrast, RGB color shift, random hue and saturation, channel shuffle: swap RGB to BGR or RBG or other, coarse dropout, motion blur, median blur, Gaussian blur, random shift-scale-rotate (i.e., all three combined). The same set of augmented images may be used for multiple training-validation cycles, or new augmentations may be generated on the fly during each cycle. An additional augmentation used for CV model training is the alteration of the 'seed' of the random number generator for extracting feature descriptors. The techniques for obtaining computer vision descriptors contain an element of randomness in extracting a sample of features. This random number can be altered and included among the augmentations to provide a more robust training for CV models.

Computer vision models rely on identifying key features of the image and expressing them in terms of descriptors. These descriptors may encode qualities such as pixel variation, gray level, roughness of texture, fixed corner points or orientation of image gradients, which are implemented in the OpenCV or similar libraries. By selection on such feature to search for in each image, a model can be built by finding which arrangement of the features is a good indicator for aneuploidy/embryo viability. This procedure is best carried out by machine learning processes such as Random Forest, Support Vector Machines, which are able to separate the images in terms of their descriptions from the computer vision analysis.

A range of computer vision descriptors are used, encompassing both small and large scale features, which are combined with traditional machine learning methods to produce "CV models" for identifying aneuploidy and mosaicism. These may optionally be later combined with deep learning (DL) models, for example into an Ensemble model or used in distillation to train a student model. Suitable computer vision image descriptors include:

Zona-Pellucida through Hough transformation: finds inner and outer ellipses to approximate the Zona Pellucida and IntraZonal Cavity split, and records the mean and difference in radii as features;

Gray-Level Co-Occurrence Matrix (GLCM) Texture Analysis: detects roughness of different regions by comparing neighboring pixels in the region. The sample feature descriptors used are: angular second moment (ASM), homogeneity, correlation, contrast and entropy. The selection of the region is obtained by randomly sampling a given number of square sub-regions of the image, of a given size, and records the results of each of the five descriptors for each region as the total set of features;

Histogram of Oriented Gradients (HOG): detects objects and features using scale-invariant feature transform descriptors and shape contexts. This method has precedence for being used in embryology and other medical imaging, but does not itself constitute a machine learning model;

Oriented Features from Accelerated Segment Test (FAST) and Rotated Binary Robust Independent Elementary Features (BRIEF) (ORB): an industry standard alternative to SIFT and SURF features, which relies on a FAST key-point detector (specific pixel) and BRIEF descriptor combination, and which has been modified to include rotation invariance;

Binary Robust Invariant Scalable Key-points (BRISK): a FAST-based detector in combination with an assembly of intensity comparisons of pixels, which is achieved by sampling each neighborhood around a feature specified at a key-point;

Maximally Stable Extremal Regions (MSER): a local morphological feature detection algorithm, through extracting covariant regions, which are stable connected components related to one or more gray-level sets extracted from the image.

Good Features To Track (GFTT): a feature detector that uses an adaptive window size to detect textures of corners, identified using Harris Corner Detection or Shi-Tomasi Corner Detection, and extracting points the exhibit a high standard deviation in their spatial intensity profile.

A computer vision (CV) model is constructed by the following method. One (or more) of the computer vision image descriptors techniques listed above is selected, and the features are extracted from all of the images in the training dataset. These features are arranged into a combined array, and then supplied to a KMeans unsupervised clustering algorithm, this array is called the Codebook, for a 'bag of visual words'. The number of clusters is a free parameter of the model. The clustered features from this point on represent the 'custom features' that are used, through whichever combination of algorithms, to which each individual image in the validation or test set will be compared. Each image has features extracted and is clustered individually. For a given image with clustered features, the 'distance' (in feature-space) to each of the clusters in the codebook is measured using a KDTree query algorithm, which gives the closest clustered feature. The results from the tree query can then be represented as a histogram, showing the frequency at which each feature occurs in that image. Finally, the question of whether a particular combination of these features corresponds to a measure of aneuploidy risk/embryo viability needs to be assessed, using machine learning. Here, the histogram and the ground-truth outcomes are used to carry out supervised learning. The methods used to obtain the final selection model include Random Forest, or Support Vector Machines (SVM).

A plurality of deep learning models may also be generated. Deep Learning models are based on neural network methods, typically convolutional neural networks (CNN) that consist of a plurality of connected layers, with each layer of 'neurons' containing a non-linear activation function, such as a 'rectifier', 'sigmoid' etc. Contrasting with feature based methods (i.e., CV models), Deep Learning and neural networks instead 'learn' features rather than relying on hand designed feature descriptors. This allows them to learn 'feature representations' that are tailored to the desired task.

These methods are suitable for image analysis, as they are able to pick up both small details and overall morphological shapes in order to arrive at an overall classification. A variety of deep learning models are available each with different architectures (i.e., different number of layers and connections between layers) such as residual networks (e.g., ResNet-18, ResNet-50 and ResNet-101), densely connected networks (e.g., DenseNet-121 and DenseNet-161), and other variations (e.g., InceptionV4 and Inception-ResNetV2). Deep Learning models may be assessed based on stabilization (how stable the accuracy value was on the validation set over the training process) transferability (how well the accuracy on the training data correlated with the accuracy on the validation set) and prediction accuracy (which models provided the best validation accuracy, for both viable and non-viable embryos, the total combined accuracy, and the balanced accuracy, defined as the weighted average accuracy across both class types of embryos). Training involves trying different combinations of model parameters and hyper-parameters, including input image resolution, choice of optimizer, learning rate value and scheduling, momentum value, dropout, and initialization of the weights (pre-training). A loss function may be defined to assess performing of a model, and during training a Deep Learning model is optimized by varying learning rates to drive the update mechanism for the network's weight parameters to minimize an objective/loss function.

Deep learning models may be implemented using a variety of libraries and software languages. In one embodiment, the PyTorch library is used to implement neural networks in the language of python. The library Pytorch additionally allows tensors to be created that utilize Hardware (GPU, TPU) acceleration, and includes modules for building multiple layers for neural networks. While deep learning is one of the most powerful techniques for image classification, it can be improved by providing guidance through the use of segmentation or augmentation described above. The use of segmentation prior to deep learning was found to have a significant effect on the performance of the deep learning method, and assisted in generating contrasting models. Thus preferably at least some deep learning models were trained on segmented images, such as images in which the IZC, or cell boundaries are identified, or the image is masked to exclude regions outside of the IZC or cell boundaries. In some embodiments the plurality of deep learning models includes at least one model trained on segmented images, and one model trained on images not subject to segmentation. Similarly augmentation was important for generating robust models.

The effectiveness of an approach is determined by the architecture of the Deep Neural Network (DNN). However, unlike the feature descriptor methods, the DNN learns the features itself throughout the convolutional layers, before employing a classifier. That is, without adding in proposed features by hand, the DNN can be used to check existing practices in the literature, as well as developing previously unguessed descriptors, especially those that are difficult for the human eye to detect and measure.

The architecture of the DNN is constrained by the size of images as input, the hidden layers, which have dimensions of the tensors describing the DNN, and a linear classifier, with the number of class labels as output. Most architectures employ a number of down-sampling ratios, with small (3×3 pixel) filters to capture notion of left/right, up-down and center. Stacks of a) Convolutional 2d layers, b) Rectified Linear Units (ReLU), and c) Max Pooling layers allow the number of parameters through the DNN to remain tractable, while allowing the filters to pass over the high level (topological) features of an image, mapping them onto the intermediate and finally microscopic features embedded in the image. The top layer typically includes one or more fully-connected neural network layers, which act as a classifier, similar to SVM. Typically, a Softmax layer is used to normalize the resulting tensor as containing probabilities after the fully connected classifier. Therefore, the output of the model is a list of probabilities that the image is either non-viable or viable. A range of AI architecture may be based on ResNet varieties (18, 34, 50, 101, 152), Wide ResNet varieties (50-2, 101-2), ResNeXt varieties (50-32x4d, 1-1-32x8d), DenseNet varieties (121, 161, 169, 201), Inception (v4), Inception-ResNet (v2), EfficientNet varieties (b0, b1, b2, b3), etc., neural network architectures.

Figure 5C:
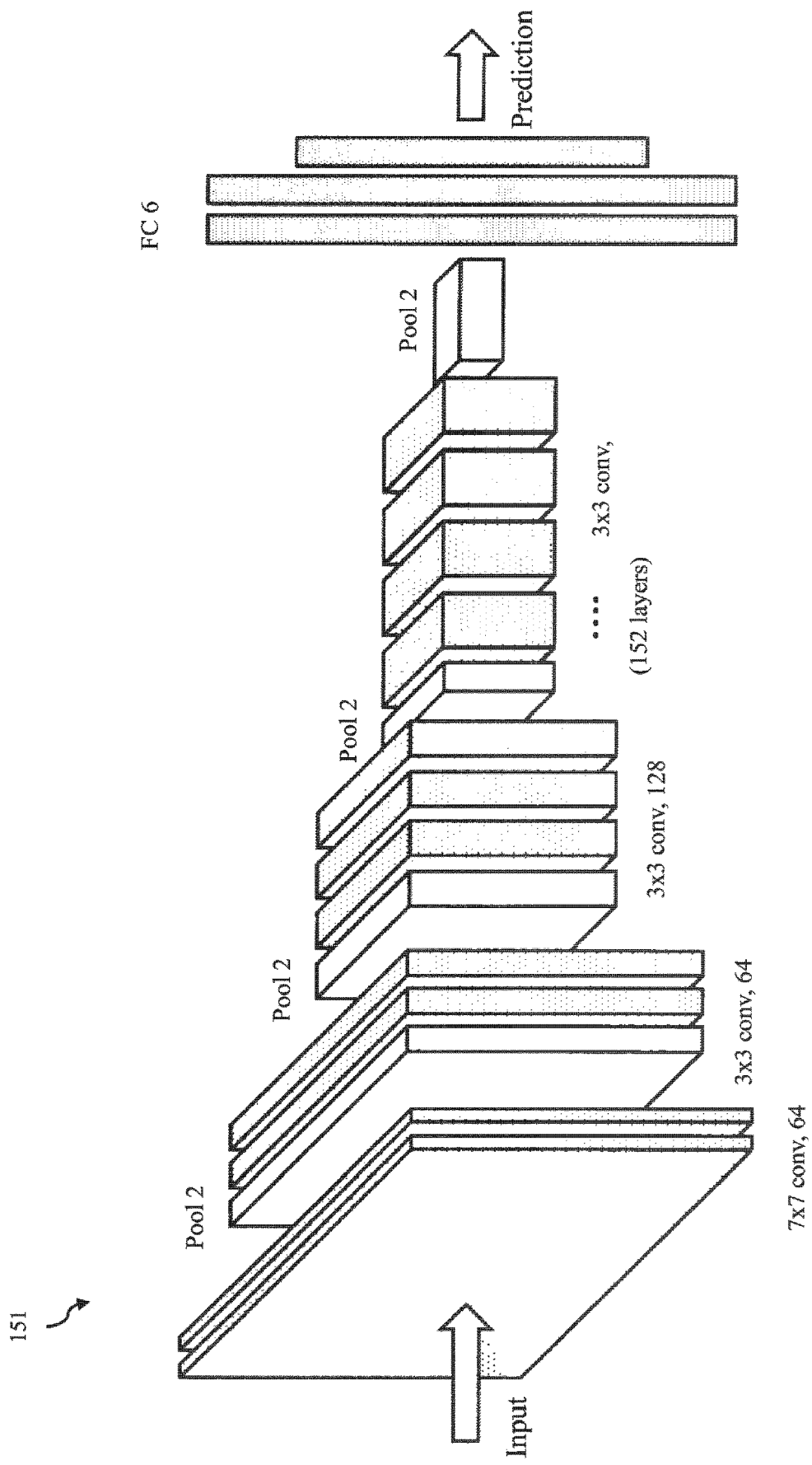
FIG. 5C is schematic architecture diagram of a deep learning method, including convolutional layers, which transform the input image to a prediction, after training, according to an embodiment.

FIG. 5C is schematic architecture diagram of an AI model 151 comprising a series of layers based on a RESNET 152 architecture which transform the input image to a prediction according to an embodiment. These include 2D convolutional layers, annotated as "CONV" in FIG. 5C, which computes cross-correlations of the input from the layer below. Each element or neuron within the convolutional layer processes the input from its receptive field only, e.g., 3×3 or 7×7 pixels. This reduces the number of learnable parameters required to describe the layer, and allows deeper neural networks to be formed than those constructed from fully-connected layers where every neuron is connected to every other neuron in the subsequent layer, which is highly memory intensive and prone to overfitting. Convolutional layers are also spatial translation invariant, which is useful for processing images where the subject matter cannot be guaranteed to be precisely centered. The AI architecture in FIG. 5C further includes max pooling layers, annotated as "POOL" in FIG. 5C, which is a down-sampling method whereby only representative neuron weights are selected within a given region, to reduce the complexity of the network and also reduce overfitting. For example, for weights within a 4×4 square region of a convolutional layer, the maximum value of each 2×2 corner block is computed, and these representative values are then used to reduce the size of the square region to 2×2 in dimension. The architecture may also include use of rectified linear units, which act as a nonlinear activation function. As a common example, the ramp function takes the following form for an input x from a given neuron, and is analogous to the activation of neurons in biology:

$$f(x)=\max(0,x) \quad (2)$$

The final layers at the end of the network, after the input has passed through all of the convolutional layers, is typically a fully connected (FC) layer, which acts as a classifier. This layer takes the final input and outputs an array of the same number of dimensions as the classification categories. For two categories, e.g., 'aneuploidy present" and 'aneuploidy not present, the final layer will output an array of length 2, which indicates the proportion that the input image contains features that align with each category respectively. A final softmax layer is often added, which transforms the final numbers in the output array to percentages that fit between 0 and 1, and both together add up to a total of 1, so that the final output can be interpreted as a confidence limit for the image to be classified in one of the categories.

One suitable DNN architecture is ResNet (and varieties) such as ResNet152, ResNet101, ResNet50 or ResNet-18. ResNet advanced the field significantly in 2016 by using an extremely large number of hidden layers, and introducing 'skip connections' also known as 'residual connections'. Only the difference from one layer to the next is calculated, which is more time-cost efficient, and if very little change is detected at a particular layer, that layer is skipped over, thus create a network that will very quickly tune itself to a combination of small and large features in the image.

Another suitable DNN architecture is DenseNet varieties, including DenseNet161, DenseNet201, DenseNet169, DenseNet121. DenseNet is an extension of Resnet, where now every layer can skip over to any other layer, with the maximal number of skip connections. This architecture requires much more memory, and so is less efficient, but can exhibit improved performance over Resnet. With a large number of model parameters, it is also easy to overtrain/overfit. All model architectures are often combined with methods to control for this.

Another suitable DNN architecture is Inception (–ResNet), such as InceptionV4, InceptionResNetV2. Inception represents a more complicated convolutional unit, whereby instead of simply using a fixed size filter (e.g., 3×3 pixels) as described in Section 3.2, several sized filters are calculated in parallel: (5×5, 3×3, 1×1 pixels), with weights that are free parameters, so that the neural network may prioritize which filter is most suitable at each layer in the DNN. An extension of this kind if architecture is to combine it with skip connects in the same way as ResNet, to create an Inception-ResNet.

As discussed above both computer vision and deep learning methods are trained using a plurality of Train-Validate cycles on pre-processed data. The Train-Validate cycle follows the following framework:

The training data is pre-processed, and split into batches (the number of data in each batch is a free model parameter but controls how fast and how stably the algorithm learns). Augmentation may be performed prior to splitting or during training.

After each batch, the weights of the network are adjusted, and the running total accuracy so far is assessed. In some embodiment weights are updated during the batch for example using gradient accumulation. When all images have been assessed 1 Epoch has been carried out, the training set is shuffled (i.e., a new randomization with the set is obtained), and the training starts again from the top, for the next epoch.

During training a number of epochs may be run, depending on the size of the data set, the complexity of the data and the complexity of the model being trained. An optimal number of epochs is typically in the range of 2 to 100, but may be more depending on the specific case. After each epoch, the model is run on the validation set, without any training taking place, to provide a measure of the progress in how accurate the model is, and to guide the user whether more epochs should be run, or if more epochs will result in overtraining.

The validation set guides the choice of the overall model parameters, or hyperparameters, and is therefore not a truly blind set. However, it is important that the distribution of images of the validation set is very similar to the ultimate blind test set that will be run after training.

In reporting the validation set results, augmentations may also be included for each image (all), or not (noaug). Furthermore, the augmentations for each image may be combined to provide a more robust final result for the image. Several combination/voting strategies may be used including: mean-confidence (taking the mean value of the inference of the model across all the augmentations), median-confidence, majority-mean-confidence (taking the majority viability assessment, and only providing the mean confidence of those that agree, and if no majority, take the mean), max-confidence, weighted average, majority-max-confidence, etc.

Another method used in the field of machine learning is transfer learning, where a previously trained model is used as the starting point to train a new model. This is also referred to as Pre-training. Pre-training is used extensively, which allows new models to be built rapidly. There are two kinds of pre-training. One embodiment of pre-training is ImageNet pre-training. Most model architectures are provided with a set of pre-trained weights, using the standard image database ImageNet. While it is not specific for medical images, and includes one thousand different types of objects, it provides a method for a model to have already learnt to identify shapes. The classifier of the thousand objects is completely removed, and a new classifier for viability replaces it. This kind of pre-training outperforms other initialization strategies. Another embodiment of pre-training is custom pre-training which uses a previously-trained embryo model, either from a study with a different set of outcomes, or on different images (PGS instead of viability, or randomly assigned outcomes). These models only provide a small benefit to the classification.

For non pre-trained models, or new layers added after pre-training such as the classifier, the weights need to be initialized. The initialization method can make a difference to the success of the training. All weights set to 0 or 1, for example, will perform very poorly. A uniform arrangement of random numbers, or a Gaussian distribution of random numbers, also represent commonly used options. These are also often combined with a normalization method, such as Xavier or Kaiming algorithms. This addresses an issue where nodes in the neural network can become 'trapped' in a certain state, by becoming saturated (close to 1), or dead (close to 0), where it is difficult to measure in which direction to adjust the weights associated with that particular neuron. This is especially prevalent when introducing a hyperbolic-tangent or a sigmoid function, and is addressed by the Xavier initialization.

In the Xavier initialization protocol, the neural network weights are randomized in such a way that the inputs of each layer to the activation function will not fall too close to either the saturated or dead extreme ends. The use of ReLU, however, is better behaved, and different initializations provide a smaller benefit, such as the Kaiming initialization. The Kaiming initialization is better suited to the case where ReLU is used as the neuron's non-linear activation profile. This achieves the same process as the Xavier initialization effectively.

In deep learning, a range of free parameters is used to optimize the model training on the validation set. One of the key parameters is the learning rate, which determines by how much the underlying neuron weights are adjusted after each batch. When training a selection model, overtraining, or overfitting the data should be avoided. This happens when the model contains too many parameters to fit, and essentially 'memorizes' the data, trading generalizability for accuracy on the training or validation sets. This is to be avoided, since the generalizability is the true measure of whether the model has correctly identified true underlying parameters that indicate embryo health, among the noise of the data, and not compromised this in order to fit the training set perfectly.

During the Validation and Test phases, success rates can sometimes drop suddenly due to overfitting during the Training phase. This can be ameliorated through a variety of tactics, including slowed or decaying learning rates (e.g., halve the learning rate every n epochs), or the use of CosineAnnealling, incorporating the aforementioned methods of tensor initialization or pre-training, and the addition of noise, such as Dropout layers, or Batch Normalization. Batch Normalization is used to counteract vanishing or exploding gradients which improves the stability of training large models resulting in improved generalization. Dropout regularization effectively simplifies the network by introducing a random chance to set all incoming weights zero within a rectifier's receptive range. By introducing noise, it effectively ensures the remaining rectifiers are correctly fitting to the representation of the data, without relying on over-specialization. This allows the DNN to generalize more effectively and become less sensitive to specific values of network weights. Similarly, Batch Normalization improves training stability of very deep neural networks, which allows for faster learning and better generalization by shifting the input weights to zero mean and unit variance as a precursor to the rectification stage.

In performing deep learning, the methodology for altering the neuron weights to achieve an acceptable classification includes the need to specify an optimization protocol. That is, for a given definition of 'accuracy' or 'loss' (discussed below) exactly how much the weights should be adjusted, and how the value of the learning rate should be used, has a number of techniques that need to be specified. Suitable optimization techniques include Stochastic Gradient Descent (SGD) with momentum (and/or Nesterov accelerated gradients), Adaptive Gradient with Delta (Adadelta), Adaptive Moment Estimation (Adam), Root-Mean-Square Propagation (RMSProp), and Limited-Memory Broyden-Fletcher-Goldfarb-Shanno (L-BFGS) Algorithm. Of these, SGD based techniques generally outperformed other optimization techniques. Typical learning rates for phase contrast microscope images of human embryos were in the range 0.01 to 0.0001. However the learning rate will depend upon batch size, which is dependent upon hardware capacity. For example larger GPUs allow larger batch sizes and higher learning rates.

Stochastic Gradient Descent (SGD) with momentum (and/or Nesterov accelerated gradients) represents the most simple and commonly used optimizer. Gradient descent algorithms typically compute the gradient (slope) of the effect of a given weight on the accuracy. While this is slow if it is required to calculate the gradient for the whole dataset to perform an update to the weights, stochastic gradient descent performs an update for each training image, one at a time. While this can result in fluctuations in the overall objective accuracy or loss achieved, it has a tendency to generalize better than other methods, as it is able to jump into new regions of the loss parameter landscape, and find new minimum loss functions. For a noisy loss landscape in difficult problems such as embryo selection, SGD performs well. SGD can have trouble navigating asymmetrical loss function surface curves that are more steep on one side than the other. This can be compensated for by adding a parameter called momentum. This helps accelerate SGD in the direction and dampens high fluctuations in the accuracy, by adding an extra fraction to the update of the weight, derived from the previous state. An extension of this method is to include the estimated position of the weight in the next state as well, and this extension is known as the Nesterov accelerated gradient.

Adaptive Gradient with Delta (Adadelta), is an algorithm for adapting the learning rate to the weights themselves, performing smaller updates for parameters that are frequently occurring, and larger updates for infrequently occurring features, and is well-suited to sparse data. While this can suddenly reduce the learning rate after a few epochs across the entire dataset, the addition of a delta parameter in order to restrict the window allowed for the accumulated past gradients, to some fixed size. This process makes a default learning rate redundant, however, and the freedom of an additional free parameter provides some control in finding the best overall selection model.

Adaptive Moment Estimation (Adam) stores exponentially decaying average of both past squared and non-squared gradients, incorporating them both into the weight update. This has the effect of providing 'friction' for the direction of the weight update, and is suitable for problems that have relatively shallow or flat loss minima, without strong fluctuations. In the embryo selection model, training with Adam has a tendency to perform well on the training set, but often overtrain, and is not as suitable as SGD with momentum.

Root-Mean-Square Propagation (RMSProp) is related to the adaptive gradient optimizers above, and almost identical to Adadelta, except that the update term to the weights divides the learning rate by an exponentially decaying average of the squared gradients.

Limited-Memory Broyden-Fletcher-Goldfarb-Shanno (L-BFGS) Algorithm. While computationally intensive, the L-BFGS algorithm that actually estimates the curvature of the loss landscape rather than other methods than attempt to compensate for this lack of estimation with additional terms. It has a tendency to outperform Adam when the data set is small, but doesn't necessarily outperform SGD in terms of speed and accuracy.

In addition to the above methods, it is also possible to include non-uniform learning rates. That is, the learning rate of the convolution layers can be specified to be much larger or smaller than the learning rate of the classifier. This is useful in the case of pre-trained models, where changes to the filters underneath the classifier should be kept more 'frozen', and the classifier be retrained, so that the pre-training is not undone by additional retraining.

While the optimizer specifies how to update the weights given a specific loss or accuracy measure, in some embodiments the loss function is modified to incorporate distribution effects. These may include cross-entropy loss (CE), weighted CE, residual CE, inference distribution or a custom loss function.

Cross Entropy Loss is a commonly used loss function, which has a tendency to outperform simple mean-squared-of-difference between the ground truth and the predicted value. If the result of the network is passed through a Softmax layer, such as is the case here, then the distribution of the cross entropy results in better accuracy. This is because is naturally maximizes the likelihood of classifying the input data correctly, by not weighting distant outliers too heavily. For an input array, batch, representing a batch of images, and class representing viable or non-viable, the cross entropy loss is defined as:

$$\text{loss}(p,C) = \Sigma_{i=1}^{M} y_i \log(p_i) \quad (3)$$

where C is the number of classes. In the binary case this can be simplified to:

$$\text{loss}(p,C) = -(y \log(p)) + (1-y)\log(1-p) \quad (4)$$

An optimized version is:

$$\text{loss (batch, class)} = -\log\left(\frac{\exp(\text{batch [class]})}{\sum_j \exp(x[j])}\right) \quad (5)$$

If the data contains a class bias, that is, more viable than non-viable examples (or vice-versa), the loss function should be weighted proportionally so that misclassifying an element of the less numerous class is penalized more heavily. This is achieved by pre-multiplying the right hand side of Eq. (2) with the factor:

$$\text{weight [class]} = \frac{N}{C * N \text{[class]}} \quad (6)$$

where N[class] is the total number of images for each class, N is the total number of samples in the dataset and C is the number of classes. It is also possible to manually bias the weight towards the viable embryos in order to reduce the number of false negatives compared to false positives, if necessary.

In some embodiments an Inference Distribution may be used. While it is important to seek a high level of accuracy in classifying embryos, it is also important to seek a high level of transferability in the model. That is, it is often beneficial to understand the distribution of the scores, and that while seeking a high accuracy is an important goal, the separate of the viable and non-viable embryos confidently with a margin of certainty is an indicator that the model will generalize well to a test set. Since the accuracy on the test set is often used to quote comparisons with important clinical benchmarks, such as the accuracy of the embryologist classification on the same embryo, ensuring generalizability should also be incorporated into the batch-by-batch assessment of the success of the model, each epoch.

In some embodiments a Custom Loss function is used. In one embodiment we have customized how we define the loss function so that the optimization surface is changed to make global minima more obvious, and so improve the robustness of the model. To achieve this, a new term is added to the loss function which maintains differentiability, called a residual term, which is defined in terms of the networks weights. It encodes the collective difference in the predicted value from the model and the target outcome for each image, and includes it as an additional contribution to the normal cross entropy loss function. The formula for the residual term is as follows, for N images:

$$\text{residual} = \sqrt{\sum_{i=1}^{N} (\text{target} - \text{prediction}) [i] * (\text{target} - \text{prediction}) [i]} \quad [7]$$

For this Custom Loss function, well-space clusters of viable and non-viable embryo scores are thus considered consistent with an improve loss rating. It is noted that this custom loss function is not specific to the embryo detection application, and could be used in other Deep Learning Models.

In some embodiments a Custom Confidence-based Loss function is used. This is a weighted loss function with two variants: linear and non-linear. For both cases, the intention is to encode the separation of the scores as a contribution to the loss function, but in a different manner to that described above, by integrating together the difference between the classes in the prediction score as the weight for the loss function. The greater the difference, the more the loss is reduced. This loss function would help to drive the prediction model to enlarge difference between the two classes and increase the confidence of the model in the result. For the confident weighting: the binary target label of an input sample $i_{th}$ is denoted as $y\in\{\pm 1\}$ specifying the ground-truth class. Assuming the outcome of the prediction model is $y_p=[y_{p0}, y_{p1}]$, $y_{p0}, y_{p1}\in[0,1]$ being the model's estimated probability output corresponding with the input $i_{th}$ and for non-viable and viable outcomes, respectively. Defining $d=|y_{p0}-y_{p1}|$ for the linear setting, and $d=-\sqrt{|y_{p0}-y_{p1}|}$ for the non-linear setting, parameter d represents the model's probability difference between predicted outcome of class 0 and class 1.

For standard log softmax function, we define $p_t$ as follows (the log(pt) would land in the loss function as a standard cross entropy loss function):

$$p_t = \begin{cases} y_{p1} & \text{if } y = 1 \\ y_{p0} & \text{otherwise} \end{cases} \quad (8)$$

For the class weighting: the weighting factor $\propto\in[0,1]$ for class 1 and $1-\propto$ for class $-1$, we define $\propto_t$ analogously to how we defined $p_t$ $$\propto_t = \begin{cases} \propto & \text{if } y = 1 \\ 1 - \propto & \text{otherwise} \end{cases} \quad (9)$$

The focusing parameter $\gamma$ smoothly adjusts the rate at which the outcome score difference affects the loss function. Finally, we would come up with the loss function that incorporates all three different weighting strategies:

$$LF=-\propto_t(1-\exp(d))^\gamma \log(p_t) \quad (10)$$

In some embodiments a Soft Loss function is used, which uses a technique called label smoothing. For each type of outcome or class (e.g., viable, non-viable, in a binary classification problem), any or all classes can exhibit label smoothing. To introduce label smoothing to create a Soft Loss function, a loss function such as weighted Cross Entropy Loss. Then, when the loss function is calculated, if any classes include label smoothing, a Kullback-Leibler (KL)-Divergence loss is calculated between the inputs to the loss function, that is, the distribution of scores for the current batch, and a modified version of the distribution of scores where each of the classes to exhibit label smoothing have been altered away from their actual value (e.g., 0 or 1) by a fractional amount e/(number of classes $-1$). This parameter e is therefore a free parameter that controls the amount of label smoothing being introduced. This KL Divergence loss is then returned as the loss function.

In some embodiments the models are combined to generate a more robust final AI model 100. That is deep learning and/or computer vision models are combined together to contribute to the overall prediction of the aneuploidy.

In one embodiment an ensemble method is used. First, models that perform well are selected. Then, each model 'votes' on one of the images (using augmentations or otherwise), and the voting strategy that leads to the best result is selected. Example voting strategies include maximum-confidence, mean-value, majority-mean-value, median-value, mean-confidence, median-confidence, majority-mean-confidence, weighted average, majority-max-confidence, etc. Once the voting strategy has been selected, the evaluation method for the combination of augmentations must also be selected, which describes how each of the rotations should be treated by the ensemble, as before. In this embodiment the final AI model 100 can thus be defined as a collection of trained AI models, using deep learning and/or computer vision models, together with a mode, which encodes the voting strategy that defines how the individual AI model results will be combined, and an evaluation mode that defines how the augmentations (if present) will be combined.

Selection of the models may be performed in such a way that their results contrast from one another, i.e., their results are independent as possible, and the scores are well distributed. This selection procedure is carried out by examining which images in the test set have been correctly identified for each model. If the sets of correctly identified images are very similar when comparing two models, or the scores provided by each model are similar to each other for a given image, then the models are not considered contrasting models. If, however, there is little overlap between the two sets of correctly identified images, or the scores provided for each image are markedly different from each other, then the models are considered contrasting. This procedure effectively assesses whether the distributions of the embryo scores on a test set for two different models are similar or not. The contrasting criterion drives model selection with diverse prediction outcome distributions, due to different input images or segmentation. This method ensured translatability by avoiding selection of models that performed well only on specific clinic datasets, thus preventing overfitting. Additionally model selection may also use a diversity criterion. The diversity criterion drives model selection to include different model's hyper-parameters and configurations. The reason is that, in practice, similar model settings result in similar prediction outcomes and hence may not be useful for the final ensemble model.

In one embodiment this can be implemented by using a counting approach and specifying a threshold similarity, such as 50%, 75% or 90% overlapping images in the two sets. In other embodiments, the scores in a set of images (e.g., the viable set) could be totaled and two sets (totals) compared, and ranked similar if the two totals are less than a threshold amount. Statistical based comparisons could also be used, for example taking into account the number of images in the set, or otherwise comparing the distribution of images in each of the sets.

Another approach in AI and machine learning is known as 'Knowledge Distillation' (shortened to Distillation) or 'Student-Teacher' models in which the distributions of the weight parameters obtained from one (or multiple) models (Teacher(s)) are used to inform the weight updates of another model (Student) via the loss function of the Student model. We will use the term Distillation to describe the process of training a Student model using Teacher model(s). The idea behind this procedure is to train the Student model to mimic a set of Teacher model(s). The intuition behind this process, is that the Teacher models contain subtle but important relationships between the predicted output probabilities (soft labels) that are not present in the original predicted probabilities (hard labels) obtained directly from the model results in the absence of the distributions from the Teacher model(s).

First, the set of Teacher model(s) are trained on the dataset of interest. The Teacher models can be of any neural network or model architecture, and can even be completely different architectures from each other or the Student model. They can either share the same dataset exactly, or have disjoint or overlapping subsets of the original dataset. Once the Teacher models are trained, the Student is trained using a distillation loss function to mimic the outputs of the Teacher models. The distillation process begins by first applying the Teacher model to a dataset that is made available to both the Teacher and Student models, known as the 'transfer dataset'. The transfer dataset can be hold-out, blind dataset drawn from the original dataset, or could be the original dataset itself. Furthermore, the transfer dataset does not have to be completely labelled, i.e., with some portion of the data not associated with a known outcome. This removal of the labelling restriction allows for the dataset to be artificially increased in size. Then the Student model is applied to the transfer dataset. The output probabilities (soft labels) of the Teacher model are compared with the output probabilities of the Student model via a divergence measure function, such as KL-Divergence, or 'relative entropy' function, computed from the distributions. A divergence measure is an accepted mathematical method for measuring the "distance" between two probability distributions. The divergence measure is then summed together with a standard cross-entropy classification loss function, so that the loss function is effectively minimizing both the classification loss, improving model performance, and also the divergence of the Student model from the Teacher model, simultaneously. Typically, the soft label matching loss (the divergence component of the new loss) and the hard label classification loss (the original component of the loss) are weighted with respect to each other (introducing an extra tunable parameter to the training process) to control the contribution of each of the two terms in the new loss function.

A model may be defined by its network weights. In some embodiments this may involve exporting or saving a checkpoint file or a model file using an appropriate function of the machine learning code/API. The checkpoint file may be a file generated by the machine learning code/library with a defined format which can be exported and then read back in (reloaded) using standard functions supplied as part of the machine learning code/API (e.g., ModelCheckpoint( ) and load_weights( )). The file format may directly sent or copied (e.g., ftp or similar protocols) or it be serialized and send using JSON, YAML or similar data transfer protocols. In some embodiments additional model metadata may be exported/saved and sent along with the network weights, such as model accuracy, number of epochs, etc., that may further characterize the model, or otherwise assist in constructing another model (e.g., a Student model) on another node/server.

Embodiments of the method may be used to generate AI models for obtaining an estimate of the presence of one or more aneuploidies in an image of an embryo. These may be implemented in a cloud based computational system configured to computationally generate the aneuploidy screening Artificial Intelligence (AI) model. Once a model is generated this can be deployed in a cloud based computational system configured to computationally generate an estimate of the presence of one or more aneuploidies in an image of an embryo. In this system the cloud based computational system comprises the previously generated (trained) aneuploidy screening Artificial Intelligence (AI) model, and the computational system is configured to receive, from a user via a user interface of the computational system, an image which is provided to the aneuploidy screening Artificial Intelligence (AI) model to obtain an estimate of the presence of one or more aneuploidies in the image. A report on the presence of one or more aneuploidies in the image to the user via the user interface. Similarly a computation system may be provided in a clinic or similar location where an image is obtained, which is configured to generate an estimate of the presence of one or more aneuploidies in an image of an embryo. In this embodiment the computational system comprises at least one processor, and at least one memory comprising instructions to configure the processor to receive an image captured during a pre-determined time window after In-Vitro Fertilization (IVF) and upload, via a user interface, the image captured during a pre-determined time window after In-Vitro Fertilization (IVF) to a cloud based Artificial Intelligence (AI) model configured to generate an estimate of the presence of one or more aneuploidies in an image of an embryo. An estimate of the presence of one or more aneuploidies in an image of an embryo is received via the user interface and displayed by the user interface.

Results

Results demonstrating the ability of AI models to isolate morphological features that correspond to specific chromosomes or chromosomal groups purely from phase-contrast microscope images are shown below. This comprises a series of example studies focusing on several of the most serious chromosomal defects (i.e., high risk of adverse outcomes post implantation) according to Table 1. In the first three cases, a simple example is constructed to illustrate whether there are morphological features that correspond to specific chromosomal abnormalities. This is done by including only the affected chromosome, and euploid viable embryos. These simplified examples provides evidence that generating an overall model, based on combining separate models each focused on a different chromosomal defect/genetic deficiency is feasible. A further example using a chromosomal group comprising the aneuploidies listed in Table 1 was also generated.

A first study was conducted to assess whether an AI model can detect a difference between euploid viable embryos, and embryos that include any abnormalities involving chromosome 21 (including mosaic embryos), which has been associated with Down Syndrome. The results of a trained model on a blind data set of 214 images achieved an overall accuracy of 71.0%.

Prior to the AI model training, a blind test set with a representation of all chromosomes considered serious health risks if involved in aneuploidy (from Table 1), and viable euploid images, was held back so that it can be used as a common test set for the trained models. The total number of images involved in the study are shown in Table 2:

TABLE 2

Breakdown by data set for chromosome 21 study (1322 images)

| Set | Total number of images | Number of aneuploid Chromosome 21 images | Number of euploid viable images |
|---|---|---|---|
| Training (80%) | 887 | 417 | 470 |
| Validation (10%) | 221 | 105 | 116 |
| Test (10%) | 214 | 68 | 146 |

The accuracy results on the test set are as follows:
Embryos exhibiting any abnormality in chromosome 21: 76.47% (52/68 correctly identified); and
Viable euploid embryos: 68.49% (100/146 correctly identified).

Figure 6A:
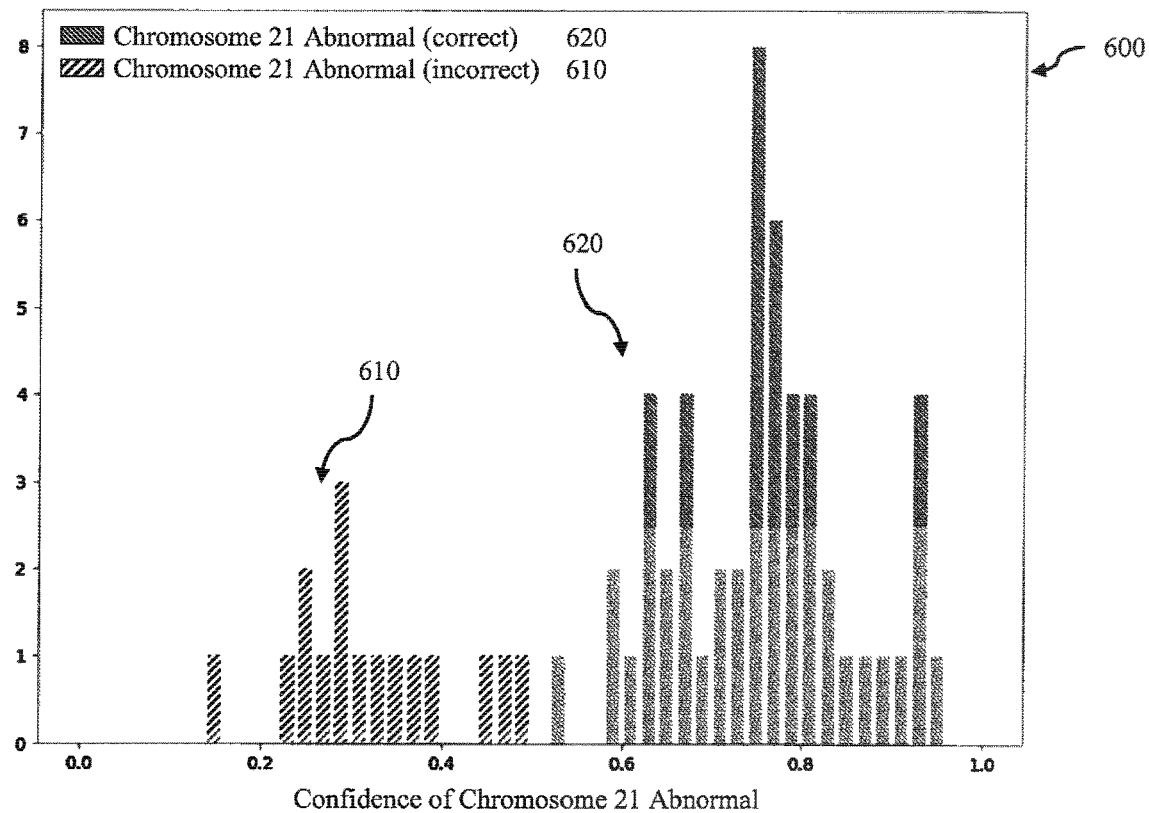
FIG. 6A is a plot of the confidence of a Chromosome 21 AI model detecting Aneuploid Chromosome 21 embryos in a blind test set where low confidence estimates shown in diagonal forward slash filled bars on the left and high confidence estimates shown in diagonal back slash filled bars on the right according to an embodiment.
Figure 6B:
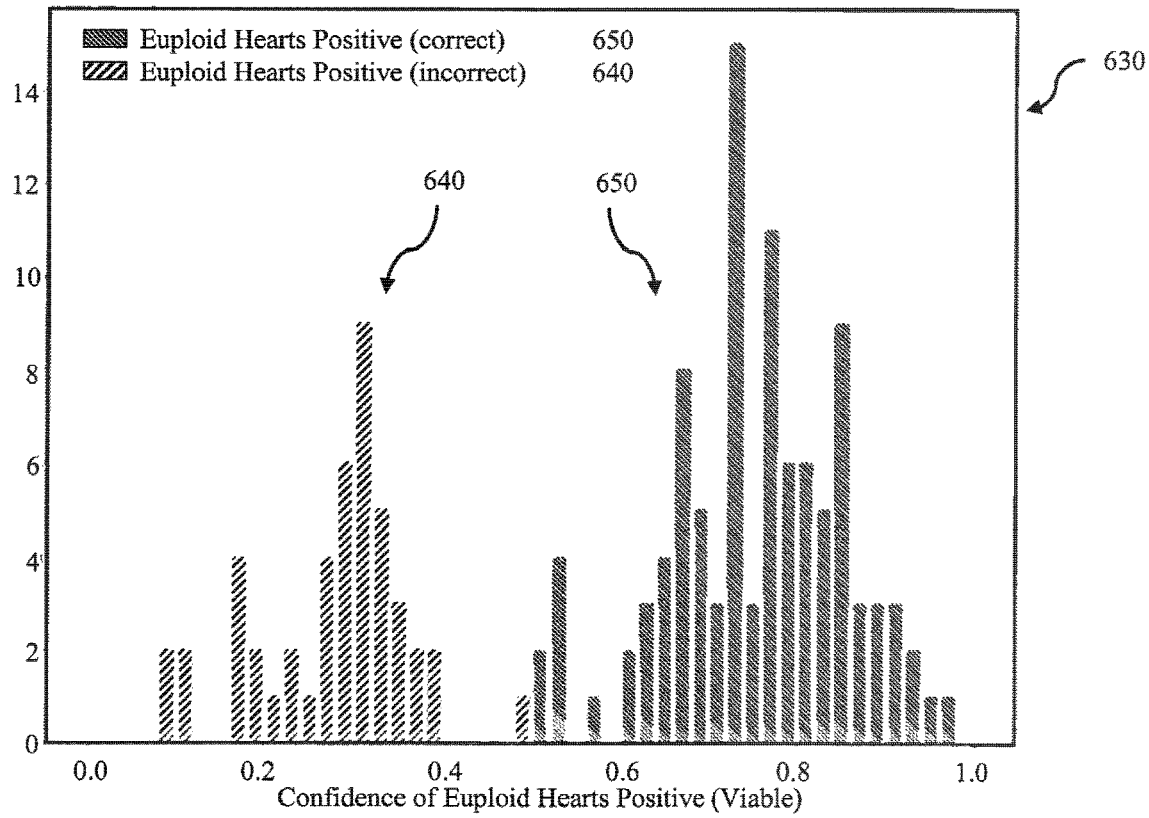
FIG. 6B is a plot of confidence of a Chromosome 21 AI model detecting Euploid viable embryos in a blind test set where low confidence estimates shown in diagonal forward slash filled bars on the left and high confidence estimates shown in diagonal back slash filled bars on the right according to an embodiment.

The distributions of the results are shown in FIGS. 6A and 6B for aneuploid and euploid-viable embryos, respectively. The aneuploid distribution 600 shows the small set 610 of chromosome 21 abnormal embryos which were incorrectly identified (missed) by the AI model on the left (diagonal forward slash filled bars on the left), and the larger set 620 of chromosome 21 abnormal embryos which were correctly identified by the AI model (diagonal back slash filled bars on the right). Similarly euploid distribution 630 shows the small set 640 of chromosome 21 normal embryos which were incorrectly identified (missed) by the AI model on the left (diagonal forward slash filled bars on the left), and the larger set 650 of chromosome 21 normal embryos which were correctly identified by the AI model (diagonal back slash filled bars on the right). In both plots the aneuploid and euploid embryo images are well separated, with clear clustering of outcome scores of their ploidy status, as provided by the AI model.

In the same manner as the chromosome 21 study, the methodology was repeated for a chromosome 16, modifications of which have been associated with Autism. The total number of images involved in the study is shown in Table 3.

TABLE 3

Breakdown by data set for chromosome 16 study (1058 images).

| Set | Total number of images | Number of aneuploid Chromosome 16 images | Number of euploid viable images |
|---|---|---|---|
| Training (80%) | 692 | 339 | 353 |
| Validation (10%) | 173 | 85 | 88 |
| Test (10%) | 193 | 47 | 146 |

The accuracy results on the test set are as follows:
Embryos exhibiting any abnormality in chromosome 16: 70.21% (33/47 correctly identified); and
Viable euploid embryos: 73.97% (108/146 correctly identified).

Figure 7A:
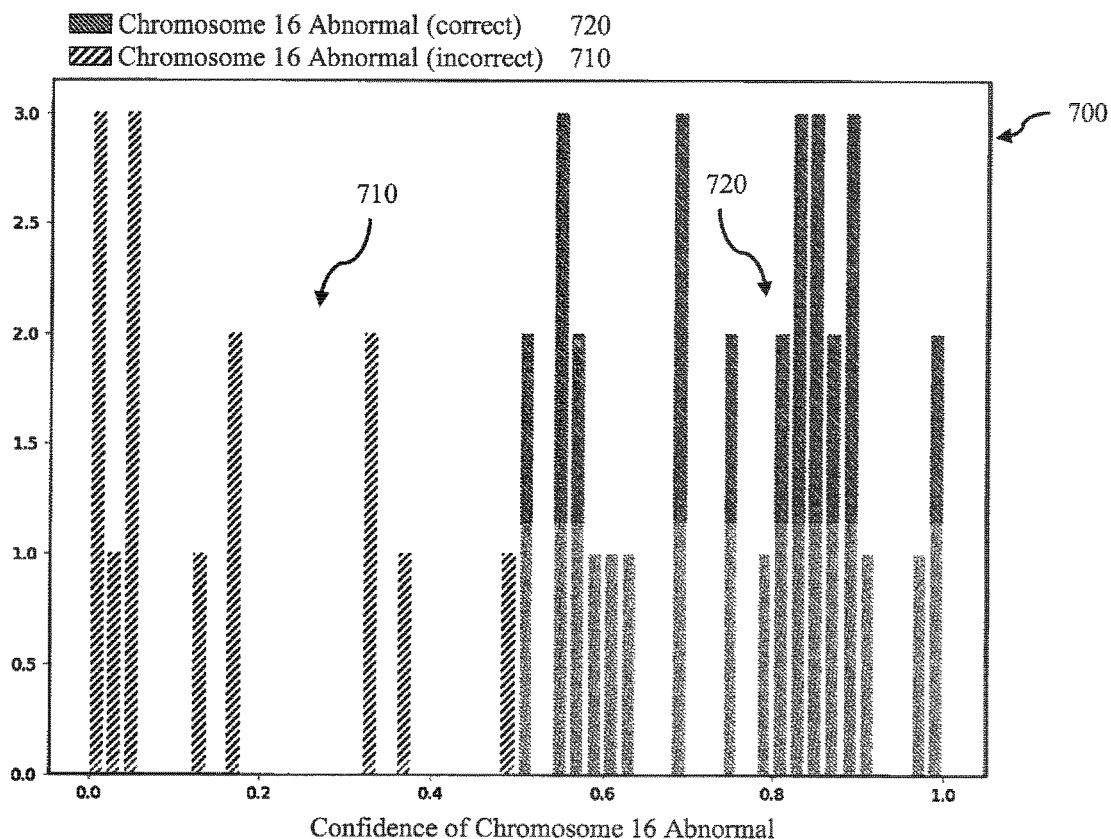
FIG. 7A is a plot of confidence of a Chromosome 16 AI model detecting Aneuploid Chromosome 16 embryos in a blind test set where low confidence estimates shown in diagonal forward slash filled bars on the left and high confidence estimates shown in diagonal back slash filled bars on the right according to an embodiment.
Figure 7B:
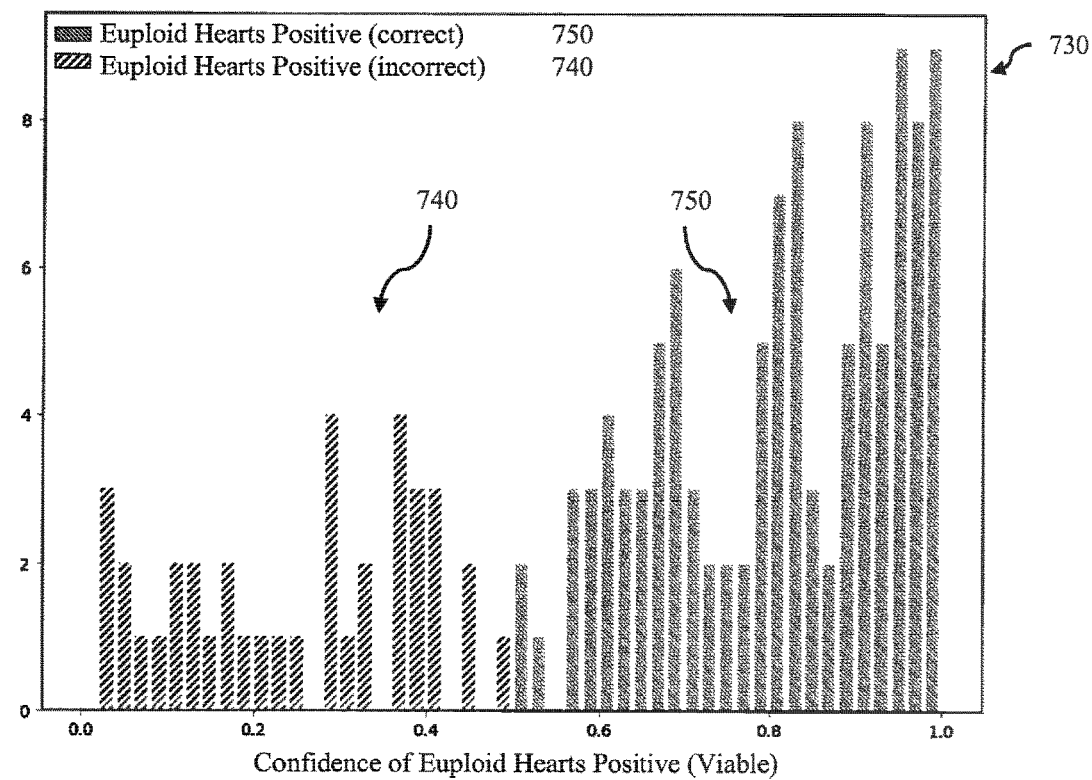
FIG. 7B is a plot of confidence of a Chromosome 16 AI model detecting Euploid viable embryos in a blind test set where low confidence estimates shown in diagonal forward slash filled bars on the left and high confidence estimates shown in diagonal back slash filled bars on the right according to an embodiment.

The distributions of the results are shown in FIGS. 7A and 7B for aneuploid and euploid-viable embryos, respectively. The aneuploid distribution 700 shows the smaller set 710 of chromosome 16 abnormal embryos which were incorrectly identified (missed) by the AI model on the left (diagonal forward slash filled bars on the left), and the larger set 750 of chromosome 16 abnormal embryos which were correctly identified by the AI model (diagonal back slash filled bars on the right). Similarly euploid distribution 730 shows the smaller set 740 of chromosome 16 normal embryos which were incorrectly identified (missed) by the AI model on the left (diagonal forward slash filled bars on the left), and the larger set 750 of chromosome 16 normal embryos which were correctly identified by the AI model (diagonal back slash filled bars on the right).

As a third case study, the methodology is repeated for chromosome 13, which is associated with Patau Syndrome. The total number of images involved in the study is shown in Table 4.

TABLE 4

Breakdown by data set for chromosome 13 study (794 images).

| Set | Total number of images | Number of aneuploid Chromosome 13 images | Number of euploid viable images |
|---|---|---|---|
| Training (80%) | 624 | 282 | 342 |
| Validation (10%) | 170 | 71 | 99 |
| Test (10%) | 193 | 44 | 149 |

The accuracy results are as follows:
Embryos exhibiting any abnormality in chromosome 13: 54.55% (24/44 correctly identified); and
Viable euploid embryos: 69.13% (103/149 correctly identified).

While the accuracies for this particular chromosome are lower than for chromosomes 21 and 16, it is expected that different chromosomes will have differing levels of confidence at which images corresponding to their specific associated aneuploidies can be identified, for a given data set size. That is each genetic abnormalities will exhibit different visible characteristics, and accordingly some abnormalities are expected to be more easily detectable than others. However as with most machine learning systems, increasing the size and diversity of the training dataset is expected to maximize the ability of a model to detect the presence of specific chromosomal abnormality. As a result, a combined approach that is able to assess multiple aneuploidies separately, all at once, can provide a useful picture as to the genetic abnormalities associated with the embryo, with varying levels of confidence, depending on rarity of cases that have been incorporated into the training.

As a fourth case study, the methodology is used on a chromosomal group analysis, where viable euploid embryos are included together with a chromosomal group of chromosomal alterations considered 'serious' comprising chromosomes 13, 14, 16, 18, 21, and 45,X (as per Table 1). For the purposes of this example, mosaicism and non-mosaicism are included together, and all types of chromosomal alteration are included together. The total number of images involved in the study are shown in Table 5.

TABLE 5

Breakdown by data set for 'serious' chromosomal group study (853 images).

| Set | Total number of images | Number of serious aneuploid Chromosome images | Number of euploid viable images |
|---|---|---|---|
| Training (80%) | 563 | 343 | 220 |
| Validation (10%) | 140 | 86 | 54 |
| Test (10%) | 150 | 91 | 59 |

The accuracy results are as follows:
Embryos exhibiting any abnormality in serious chromosomes: 54.95% (50/91 correctly identified); and
Viable euploid embryos: 64.41% (38/59 correctly identified).

Figure 8A:
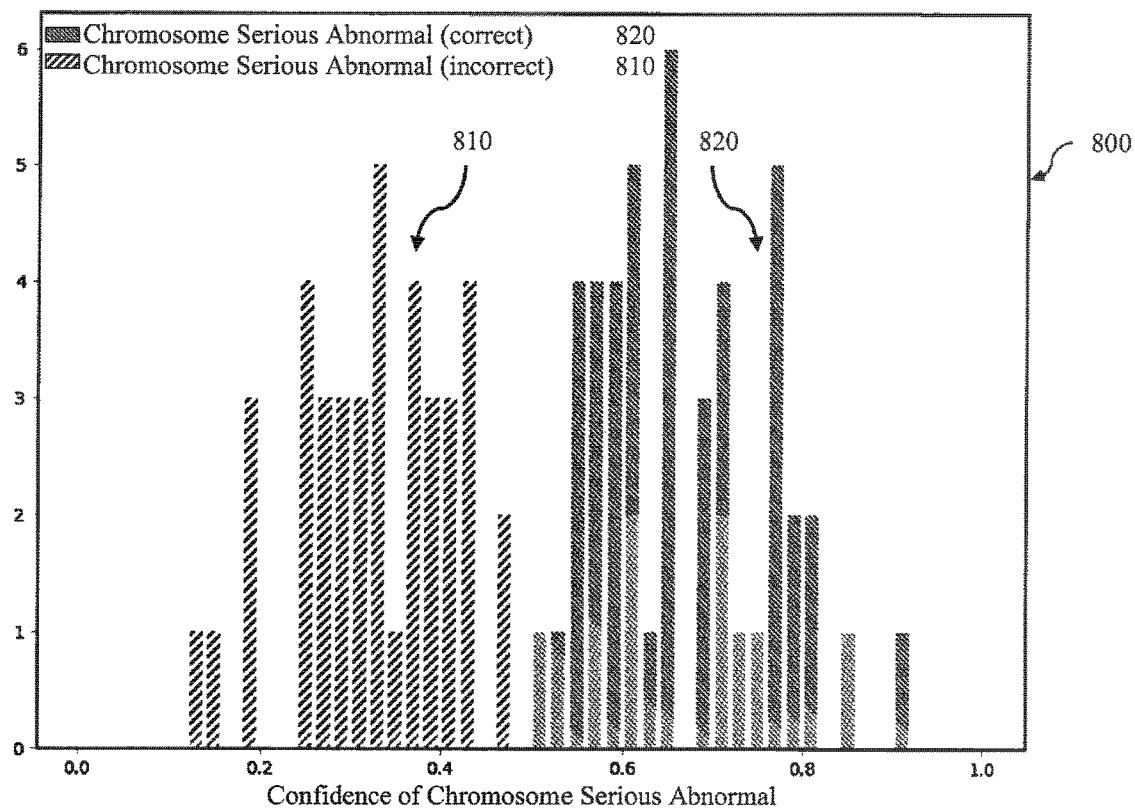
FIG. 8A is a plot of confidence of a Chromosomal Serious Group (14, 16, 18, 21, and 45,X) AI model detecting aneuploidies in chromosomes 14, 16, 18, 21, and 45,X in a blind test set where low confidence estimates shown in diagonal forward slash filled bars on the left and high confidence estimates shown in diagonal back slash filled bars on the right according to an embodiment.
Figure 8B:
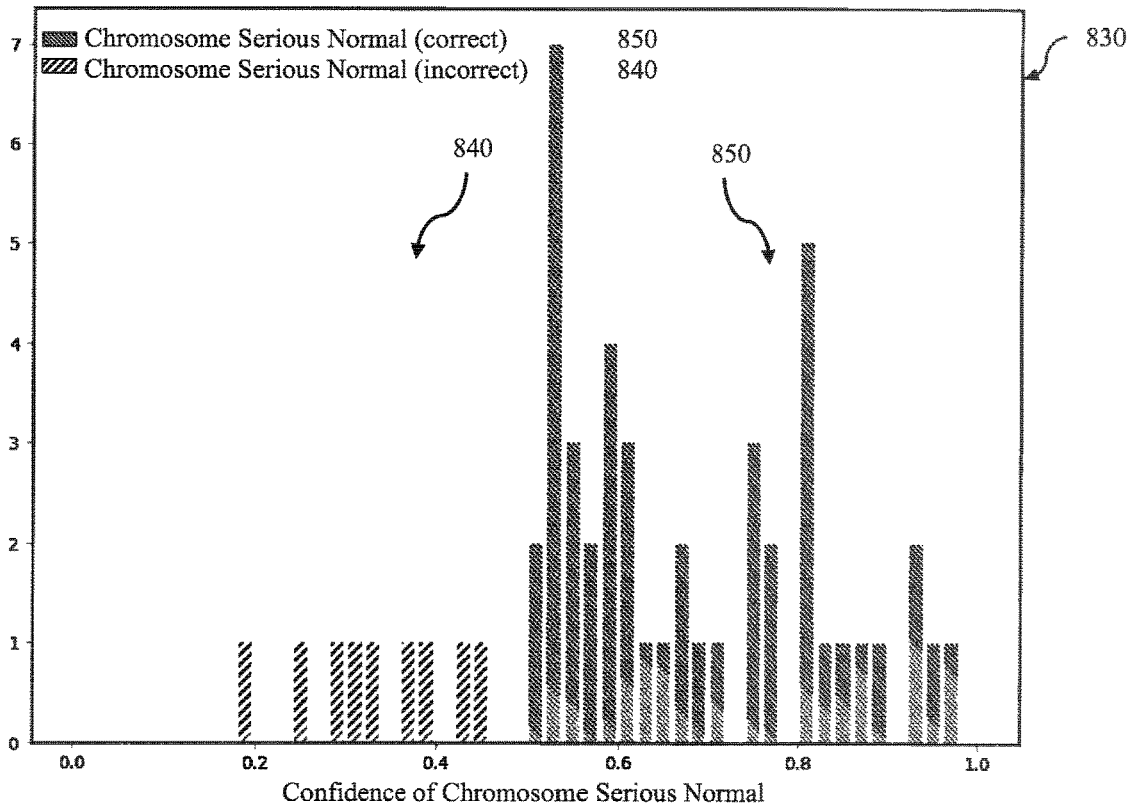
FIG. 8B is a plot of confidence of a is a plot of confidence of a Chromosomal Serious Group (14, 16, 18, 21, and 45,X) AI model detecting Euploid viable embryos in a blind test set where low confidence estimates shown in diagonal forward slash filled bars on the left and high confidence estimates shown in diagonal back slash filled bars on the right according to an embodiment.

The distributions of the results are shown in FIGS. 8A and 8B for aneuploid and euploid-viable embryos, respectively. The aneuploid distribution 800 shows the smaller set 810 of aneuploid/abnormal embryos which were incorrectly identified (missed) by the AI model on the left (diagonal forward slash filled bars on the left) as being in the chromosome serious group and the larger set 820 of aneuploid/abnormal embryos which were correctly identified by the AI model (diagonal back slash filled bars on the right) as being in the chromosome serious group. Similarly euploid distribution 830 shows the smaller set 840 of normal euploid embryos which were incorrectly identified (missed) by the AI model on the left (diagonal forward slash filled bars on the left) as chromosome serious, and the larger set 850 of normal euploid embryos which were correctly identified by the AI model (diagonal back slash filled bars on the right).

While the accuracies for this chromosomal group are lower than for individual chromosomes, it is expected that grouped chromosomes of similar levels of severity, or specific combinations on a morphological basis, corresponding to their specific associated aneuploidies can be identified, for a given data set size. That is each genetic abnormalities will exhibit different visible characteristics, and accordingly some abnormalities are expected to be more easily detectable than others. However as with most machine learning systems, increasing the size and diversity of the training dataset is expected to maximize the ability of a model to detect the presence of specific chromosomal abnormality. As a result, a combined approach that is able to assess multiple aneuploidies separately, all at once, can provide a useful picture as to the genetic abnormalities associated with the embryo, with varying levels of confidence, depending on rarity of cases that have been incorporated into the training.

These 4 studies indicate that AI/machine learning and computer vision techniques can separately identify morphological features associated with abnormalities in chromosomes 21, 16 and 13 and combined chromosomal groups.

The AI models are each able to detect the morphological characteristics associated with certain serious chromosomal abnormalities with a certain level of confidence. The histograms of scores associated with the ploidy status, provided by the selection model, show a reasonable separation between the euploid and aneuploid embryo images.

The morphological features associated with chromosomal abnormalities could potentially be subtle and complex, making it a challenge to discover these patterns effectively by training on a small dataset. Whilst this study does indicate a strong correlation between embryo morphology in images and chromosomal abnormalities, it is expected that greater accuracy would be achieved with a much larger and diverse dataset to train the AI model.

These studies illustrate that the viability of the construction of a general aneuploidy assessment model based on combining separate models each focused on a different chromosomal abnormalities. Such a more general aneuploidy assessment model could incorporate a wider variety of chromosome abnormalities, both severe and mild, as outlined in Table 1, or as judged according to clinical practice. That is in contrast to previous systems which typically just lump all aneuploidies (and mosaics) together to give a present/absent call, the present system improves performance by breaking the problem up into independent chromosomal groups and separately training individual models on each group, before bringing these models together to enable detection of a wide range of chromosomal abnormalities. Breaking the problem down into smaller Chromosomal group, and then training multiple different models, each of which is trained in a different way or has a different configuration or architecture (e.g., hierarchical, binary, multi-class, multi-group), generates a diversity of models each of which is effectively solving a different optimization problem and so generating a different result on an input image. This diversity then allows an optimal model to be selected. Additionally this approach is designed to identify mosaicism, which is not currently detectable with invasive screening methods. During an IVF cycle, embryos are a precious and limited resource. Current success rates (in terms of viable pregnancies) are low, and the financial and emotional costs of additional cycles are high. Thus providing an improved non-invasive aneuploidy assessment tool, based on defining chromosomal groups, such as those based on severity of adverse outcomes, provides a more nuanced and informative result to clinicians and patients. This allows more informed decisions to be made, particularly in difficult circumstances where all available embryos (for the current cycle) exhibit aneuploidy or mosaicism, and thus allows clinicians and patients to balance possible risks and make a more informed selection decision of which embryo to implant.

Several embodiments are discussed including hierarchical layered models and binary models, and single group or multi-group models. In particular by assigning quality labels to embryo images a hierarchical layered model can be used to train the AI model. In this embodiment a hierarchical sequence of layered models is generated and a separate hierarchical layered model may be generated for each chromosomal group. In each layer the images are divided based on quality with the best quality images used to train the model at that layer. That is at each layer the training set is partitioned in the best quality images and other images. The model at that layer is trained on the best quality images, and the other images are passed down to the next layer and the process repeated (so the remaining images are separated into next best quality images and other images). The models in the hierarchical layered model can be all binary models, all multi-class models or a combination of both binary and multi-class models across the layers. Additionally this hierarchical training method may also be used to train a multi-group model. The rationale behind the hierarchical layered model approach is that embryo images that are considered high quality will likely have the highest quality morphological features in the images with minimal abnormalities (i.e., "will look like the best embryos"), and therefore will have the greatest morphological disparity/difference compared with embryo images comprising chromosome deficiencies (i.e., "will look bad or have abnormal features"). This thus enables the AI algorithms to better detect and predict the morphological features between these two (extreme) classifications of images. The process can be repeated many times, with different number of layers/quality labels, to generate a set of hierarchical layered models. Multiple independent hierarchical layered model models are generated for each chromosomal group and from this set of hierarchical layered model models a best hierarchical layered model can be selected. This can be based on a quality metric, or ensemble or distillation techniques may be used.

In some embodiments, a set of binary models may be generated for each chromosomal group, or one or more multi-group model which classifies all of the chromosomal groups (or at least multiple chromosomal groups). Multiple different sets of binary models and multiple multi-class models may be generated, as well as multi-group models including hierarchical multi-group models. These provide additional diversity of AI models. Once a set of candidate models have been generated these can be used to generate a final AI model to identify each of the chromosomal groups in an image. This can further be refined or generated using ensemble, distillation, or other similar methods for training a final single model based on multiple models. Once the final model is selected, this can then be deployed to classify new images during IVF, and thus assist in selection of embryo (or embryos) for implantation, for example by identifying and excluding high embryos, or alternatively by identifying the embryos with the lowest risk of aneuploidy.

The methodology developed in the combination of studies on chromosomal abnormalities can thus be used to characterize embryo images prior to pre-implantation genetic diagnosis (PGD), as a pre-screening tool, or to provide a suite of high-level genetic analysis to supplement clinics that do not have access to readily-available PGD techniques. For example if images suggest a high probability/confidence of the presence of an adverse chromosomal abnormality, then the embryo could be discarded, so that only embryos considered to be low risk are implanted, or subject to invasive (and higher risk) PGD techniques.

Those of skill in the art would understand that information and signals may be represented using any of a variety of technologies and techniques. For example, data, instructions, commands, information, signals, bits, symbols, and chips may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software or instructions, middleware, platforms, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two, including cloud based systems. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or other electronic units designed to perform the functions described herein, or a combination thereof. Various middleware and computing platforms may be used.

In some embodiments the processor module comprises one or more Central Processing Units (CPUs), Graphical processing units (GPU) and/or Tensor processing units (TPU) configured to perform some of the steps of the methods. Similarly a computing apparatus may comprise one or more CPUs, GPUs and/or TPUs. A CPU may comprise an Input/Output Interface, an Arithmetic and Logic Unit (ALU) and a Control Unit and Program Counter element which is in communication with input and output devices through the Input/Output Interface. The Input/Output Interface may comprise a network interface and/or communications module for communicating with an equivalent communications module in another device using a predefined communications protocol (e.g., IEEE 802.11, IEEE 802.15, TCP/IP, UDP, etc.). The computing apparatus may comprise a single CPU (core) or multiple CPU's (multiple core), or multiple processors. The computing apparatus is typically a cloud based computing apparatus using GPU or TPU clusters, but may be a parallel processor, a vector processor, or be a distributed computing device. Memory is operatively coupled to the processor(s) and may comprise RAM and ROM components, and may be provided within or external to the device or processor module. The memory may be used to store an operating system and additional software modules or instructions. The processor(s) may be configured to load and executed the software modules or instructions stored in the memory.

Software modules, also known as computer programs, computer codes, or instructions, may contain a number a number of source code or object code segments or instructions, and may reside in any computer readable medium such as a RAM memory, flash memory, ROM memory, EPROM memory, registers, hard disk, a removable disk, a CD-ROM, a DVD-ROM, a Blu-ray disc, or any other form of computer readable medium. In some aspects the computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media. In another aspect, the computer readable medium may be integral to the processor. The processor and the computer readable medium may reside in an ASIC or related device. The software codes may be stored in a memory unit and the processor may be configured to execute them. The memory unit may be implemented within the processor or external to the processor, in which case it can be communicatively coupled to the processor via various means as is known in the art.

Further, it should be appreciated that modules and/or other appropriate means for performing the methods and techniques described herein can be downloaded and/or otherwise obtained by computing device. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a computing device can obtain the various methods upon coupling or providing the storage means to the device. Moreover, any other suitable technique for providing the methods and techniques described herein to a device can be utilized.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers. The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

Aspects and features of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for computationally generating an aneuploidy screening Artificial Intelligence (AI) model for screening embryo images for the presence of aneuploidy, comprising:
defining a plurality of chromosomal group labels, wherein each group comprises one or more distinct aneuploidies comprising distinct genetic alterations or chromosomal abnormalities;
generating a training dataset from a first set of images, wherein each image comprises an image of an embryo captured after in-vitro fertilization, and is labelled with one or more chromosomal group labels where each label indicates if at least one aneuploidy associated with the respective chromosomal group is present in at least one cell of the embryo, and the training dataset includes images labelled with each of the chromosomal groups;
generating a test dataset from a second set of images, wherein each image comprises an image of an embryo taken after in-vitro fertilization, and is labelled with one or more chromosomal group labels where each label indicates if at least one aneuploidy associated with the respective chromosomal group is present, and the test dataset includes images labelled with each of the chromosomal groups;
separately training at least one chromosomal group AI model for each chromosomal group using the training dataset for training all models, wherein each chromosomal group AI model is trained to identify morphological features in images labelled with the associated chromosomal group label, and/or training at least one multi-group AI model on the training data wherein each multi-group AI model is trained to independently identify morphological features in images labelled with each of the associated chromosomal group labels to generate a multi-group output on an input image to indicate whether at least one aneuploidy associated with each of the chromosomal group is present or absent in the image;
selecting a best chromosomal group AI model for each of the chromosomal groups or a best multi-group AI model using the test dataset;
and deploying the selected AI model to screen embryo images for the presence of one or more aneuploidies.

2. The method as claimed in claim 1, wherein the step of separately training at least one chromosomal group AI model for each chromosomal group and/or training at least one multi-group AI model comprises training a hierarchical layered model, wherein training a hierarchical layered model comprises:
training a hierarchical sequence of layered models, wherein at each layer, images associated with a chromosomal group are assigned a first label and are trained against a second set of images, wherein the second set of images are grouped based on a maximum level of quality, and at each sequential layer the second set of images are subset of images from the second set in the previous layer having a lower quality than the maximum quality of the second set in the previous layer.

3. The method as claimed in claim 2, wherein training a hierarchical layered model comprises:

allocating a quality label to each image in the plurality of images, wherein the set of quality labels comprises a hierarchical set of quality labels comprising at least "viable euploid embryos", "euploid non-viable embryos", "non-serious aneuploid embryos", and "serious aneuploid embryos";
training a top layer model by dividing the training set into a first quality dataset with a "viable euploid embryos" label and another dataset comprising all other images, and training a model on images labelled with the chromosomal group and images in the first quality dataset;
sequentially training one or more middle layer models, wherein at each middle layer a next quality level dataset is generated from selecting images with labels with the highest quality label in the other dataset, and a model is trained on images labelled with the chromosomal group and images in the next quality dataset; and
training a base layer model on images labelled with the chromosomal group and images in the other dataset from the previous layer.

4. The method as claimed in claim 3, wherein after training a first base level model for a first chromosomal group, for each other chromosomal group training a hierarchical layered model comprises training the other chromosomal group against the other dataset used to train the first base level model.

5. The method as claimed in claim 2 wherein the step of separately training at least one chromosomal group AI model for each chromosomal group further comprises training one or more binary models for each chromosomal group comprising:
labelling images in the training dataset with a label matching the chromosomal group with a present label, and labelling all other images in the training set with an absent label, and training a binary model using the present and absent labels to generate a binary output on an input image to indicate whether the a chromosomal abnormality associated with the chromosomal group is present in the image.

6. The method as claimed in claim 2 wherein the hierarchical layered models are each binary models.

7. The method as claimed in claim 1, wherein each chromosomal group further comprises a plurality of mutually exclusive aneuploidy classes wherein the probabilities of the aneuploidy classes within a chromosomal group sum to 1, and one or more of the AI models is a multi-class AI model trained to estimate the probability of each aneuploidy class within a chromosomal group.

8. The method as claimed in claim 7, wherein the aneuploidy classes comprise ("loss", "gain", "duplication", "deletion", "normal").

9. The method as claimed in claim 1, further comprising:
generating an Ensemble model for each chromosomal group comprising:
training a plurality of final models, wherein each of the plurality of final models is based on the best chromosomal group AI model for the respective group, and each of the plurality of final models is trained on the training dataset with a different set of initial conditions and image ordering; and
combining the plurality of trained final models according to an ensemble voting strategy.

10. The method as claimed in claim 1, further comprising:
generating a distillation model for each chromosomal group comprising:

training a plurality of teacher models, wherein each of the plurality of teacher models is based on the best chromosomal group AI model for the respective group, and each of the plurality of teacher models is trained on at least part of the training dataset with a different set of initial conditions and image ordering; and training a student model using the plurality of trained teacher models on the training dataset using a distillation loss function.

11. The method as claimed in claim 1, further comprising:
receiving a plurality of images, each image comprises an image of an embryo taken after in-vitro fertilization and one or more aneuploidy outcomes;
separating the plurality of images into the first set of images and the second set of images, and assigning one or more chromosomal group labels to each image based on the associated one or more aneuploidy outcomes, wherein the first set of images and the second set of images have similar proportions of each of the chromosomal group labels.

12. The method as claimed in claim 1, wherein each group comprises a plurality of distinct aneuploidies with similar risks of adverse outcomes.

13. The method as claimed in claim 12, wherein the plurality of chromosomal group labels comprises at least a low risk group, and a high risk group.

14. The method as claimed in claim 13 wherein the low risk group comprises at least chromosomes 1, 3, 4, 5, 17, 19, 20 and '47,XYY' and the high risk group comprises a least chromosomes 13, 16, 21 and '45,X', '47,XXY' and '47,XXX'.

15. The method as claimed in claim 1 wherein the images are captured within 3 to 5 days post fertilization.

16. The method as claimed in claim 1, wherein the relative proportions of each of the chromosomal groups in the test dataset is similar to the relative proportions of each of the chromosomal groups in the training dataset.

17. A cloud based computational system comprising one or more computing apparatus, comprising one or more processors and one or more memories wherein the cloud based computational system is configured to computationally generate an aneuploidy screening Artificial Intelligence (AI) model by:
defining a plurality of chromosomal group labels, wherein each group comprises one or more distinct aneuploidies comprising distinct genetic alterations or chromosomal abnormalities;
generating a training dataset from a first set of images, wherein each image comprises an image of an embryo captured after in-vitro fertilization, and is labelled with one or more chromosomal group labels where each label indicates if at least one aneuploidy associated with the respective chromosomal group is present in at least one cell of the embryo, and the training dataset includes images labelled with each of the chromosomal groups;
generating a test dataset from a second set of images, wherein each image comprises an image of an embryo taken after in-vitro fertilization, and is labelled with one or more chromosomal group labels where each label indicates if at least one aneuploidy associated with the respective chromosomal group is present, and the test dataset includes images labelled with each of the chromosomal groups;
separately train at least one chromosomal group AI model for each chromosomal group using the training dataset for training all models, wherein each chromosomal group AI model is trained to identify morphological features in images labelled with the associated chromosomal group label, and/or training at least one multi-group AI model on the training data wherein each multi-group AI model is trained to independently identify morphological features in images labelled with each of the associated chromosomal group labels to generate a multi-group output on an input image to indicate whether at least one aneuploidy associated with each of the chromosomal group is present or absent in the image;
selecting a best chromosomal group AI model for each of the chromosomal groups or a best multi-group AI model using the test dataset, wherein the aneuploidy screening AI model comprises the selected best chromosomal group AI model for each of the chromosomal groups or the best multi-group AI model, and in use, the aneuploidy screening AI model is used to screen embryo images for the presence of one or more aneuploidies.

18. A cloud based computational system configured to computationally generate an estimate of the presence of one or more aneuploidies in an image of an embryo, wherein the computational system comprises:
one or more computation servers comprising one or more processors and one or more memories configured to:
store an aneuploidy screening Artificial Intelligence (AI) model configured to generate an estimate of the presence of one or more aneuploidies in an image of an embryo;
receive, from a user via a user interface of the computational system, an image;
provide the image to the aneuploidy screening AI model to obtain an estimate of the presence of one or more aneuploidies in the image; and
send a report on the presence of one or more aneuploidies in the image to the user via the user interface,
wherein the aneuploidy screening AI model is generated by:
defining a plurality of chromosomal group labels, wherein each group comprises one or more distinct aneuploidies comprising distinct genetic alterations or chromosomal abnormalities;
generating a training dataset from a first set of images, wherein each image comprises an image of an embryo captured after in-vitro fertilization, and is labelled with one or more chromosomal group labels where each label indicates if at least one aneuploidy associated with the respective chromosomal group is present in at least one cell of the embryo, and the training dataset includes images labelled with each of the chromosomal groups;
generating a test dataset from a second set of images, wherein each image comprises an image of an embryo taken after in-vitro fertilization, and is labelled with one or more chromosomal group labels where each label indicates if at least one aneuploidy associated with the respective chromosomal group is present, and the test dataset includes images labelled with each of the chromosomal groups;
separately train at least one chromosomal group AI model for each chromosomal group using the training dataset for training all models, wherein each chromosomal group AI model is trained to identify morphological features in images labelled with the associated chromosomal group label, and/or training at least one multi-group AI model on the training data wherein each multi-group AI model is trained to independently identify morphological features in images labelled with each of the associated chromosomal group labels to generate a multi-group output on an input image to indicate whether at least one aneuploidy associated with each of the chromosomal group is present or absent in the image;

selecting a best chromosomal group AI model for each of the chromosomal groups or a best multi-group AI model using the test dataset, wherein the aneuploidy screening AI model comprises the selected best chromosomal group AI model for each of the chromosomal groups or the best multi-group AI model.

19. A computational system configured to generate an estimate of the presence of one or more aneuploidies in an image of an embryo, wherein the computational system comprises at least one processor, and at least one memory comprising instructions to configure the at least one processor to:

receive an image captured during a pre-determined time window after In-Vitro Fertilization (IVF);

upload, via a user interface, the image captured during a pre-determined time window after In-Vitro Fertilization (IVF) to a cloud based aneuploidy screening Artificial Intelligence (AI) model configured to generate an estimate of the presence of one or more aneuploidies in an image of an embryo;

receive an estimate of the presence of one or more aneuploidies in an image of an embryo via the user interface; and display the estimate of the presence of one or more aneuploidies in an image of an embryo via the user interface, wherein the cloud based aneuploidy screening AI model is generated by:

defining a plurality of chromosomal group labels, wherein each group comprises one or more distinct aneuploidies comprising distinct genetic alterations or chromosomal abnormalities;

generating a training dataset from a first set of images, wherein each image comprises an image of an embryo captured after in-vitro fertilization, and is labelled with one or more chromosomal group labels where each label indicates if at least one aneuploidy associated with the respective chromosomal group is present in at least one cell of the embryo, and the training dataset includes images labelled with each of the chromosomal groups;

generating a test dataset from a second set of images, wherein each image comprises an image of an embryo taken after in-vitro fertilization, and is labelled with one or more chromosomal group labels where each label indicates if at least one aneuploidy associated with the respective chromosomal group is present, and the test dataset includes images labelled with each of the chromosomal groups;

separately train at least one chromosomal group AI model for each chromosomal group using the training dataset for training all models, wherein each chromosomal group AI model is trained to identify morphological features in images labelled with the associated chromosomal group label, and/or training at least one multi-group AI model on the training data wherein each multi-group AI model is trained to independently identify morphological features in images labelled with each of the associated chromosomal group labels to generate a multi-group output on an input image to indicate whether at least one aneuploidy associated with each of the chromosomal group is present or absent in the image;

selecting a best chromosomal group AI model for each of the chromosomal groups or a best multi-group AI model using the test dataset, wherein the aneuploidy screening AI model comprises the selected best chromosomal group AI model for each of the chromosomal groups or the best multi-group AI model.

* * * * *